INVENTORS F. B. CROWSON
V. M. ROBERTS
BY
R. C. Lipton
ATTORNEY

June 9, 1964 F. B. CROWSON ETAL 3,136,851
AUTOMATIC TELEGRAPH TEST LINE
Filed Nov. 15, 1961 19 Sheets-Sheet 5
FIG. 5
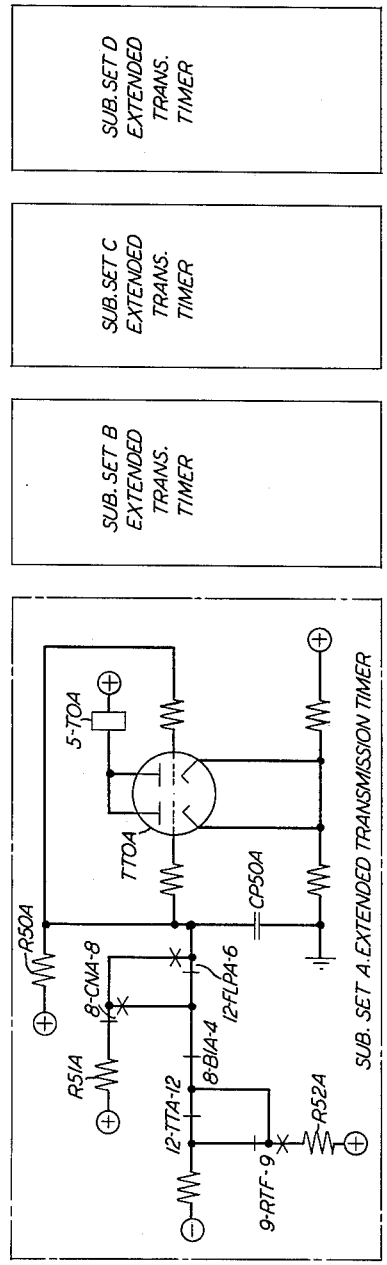
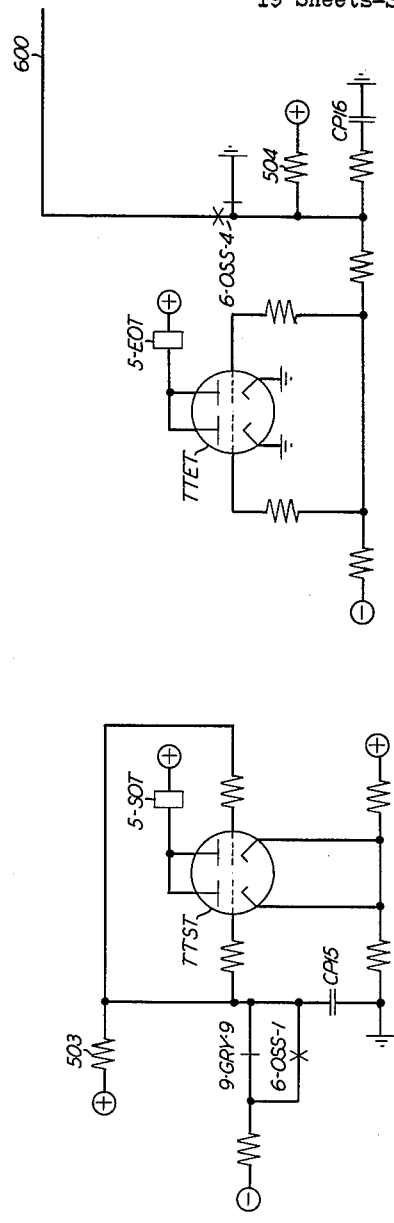

June 9, 1964  F. B. CROWSON ETAL  3,136,851
AUTOMATIC TELEGRAPH TEST LINE
Filed Nov. 15, 1961  19 Sheets-Sheet 15

FIG. 15

_United States Patent Office_

3,136,851
Patented June 9, 1964

3,136,851
AUTOMATIC TELEGRAPH TEST LINE
Fred B. Crowson, Brooklyn, N.Y., and Vince M. Roberts, Ridgewood, N.J., assignors to Bell Telephone Laboratories, Incorporated, New York, N.Y., a corporation of New York
Filed Nov. 15, 1961, Ser. No. 152,490
15 Claims. (Cl. 178—69)

This invention relates to an automatic test line for data transmission sets and more particularly to a test line for automatically performing a sequence of transmission tests with remote subscriber data subsets.

A broad object of this invention is to provide an improved test line for automatically testing data sets.

To perform a transmission test for a data transmission set, it is preferable to provide a plurality of test phases which include transmitting undistorted test signals to the subset, transmitting distorted test signals to the subset and measuring the distortion of signals received from the subset. In present known arrangements, where a transmission test is desired by an operator or maintenance man at the data set, the services of trained personnel at a central office test position is required to connect the data set line to the various test signal sources and measuring device in accordance with a sequence arranged between the test position personnel and the data set operator. In addition, each source of test signals is arranged to be connected to only one data set line at a time.

It is an object of this invention to simultaneously perform transmission tests with a plurality of remote subscribers.

Another object of this invention is to automatically program the application of signals from a plurality of data signal sources to a transmission line.

A further object of this invention is to program a test sequence wherein signals are transmitted during one phase and the quality of received signals is measured during another phase.

An additional object of this invention is to maintain a signal source connected to a transmission line in response to a signal from the line.

In the copending application of T. L. Doktor, G. Parker, L. A. Weber and H. M. Zydney, Serial No. 141,672, filed September 29, 1961, which issued as Patent 3,113,176 on December 3, 1963, there is disclosed a subscriber data set which is arranged to call other subscriber sets and communicate by voice frequency signals over telephone lines by way of a telephone switching network. The present invention provides an automatic test line for performing transmission tests with subscriber data sets of this type. The test line is preferably connected to the telephone switching office by way of a plurality of telephone lines whereby a plurality of data sets may simultaneously call the test line.

In accordance with the present invention, the test line includes a test sentence generator circuit having a first and second output for simultaneously providing undistorted and distorted coded test sentences, and an information generator for providing successive code sequences, each disclosing the transmissive quality of an individual one of the two test sentences. Associated with each telephone line is a logic circuit which is programed to provide consecutive phases when the line is called by a data set wherein a code sequence followed by a test sentence is applied to the calling line during each of the phases. In addition, the logic circuits have simultaneous access to the outputs of the generators so that two or more circuits may be in the same phase or in different phases at the same time. At the conclusion of the several phases of test signal transmission the logic circuit seizes a distortion measuring circuit and instruction generator whereby the distortion of signals from the subscriber subset may be measured and the subscriber is advised of the quality of the signal transmission.

It is a feature of this invention to apply a predetermined one of the code sequences followed by the code sentence individual thereto to the calling line during each of the phases.

It is an additional feature of this invention to advance the program of each logic circuit at the termination of each test sentence interval whereby the several simultaneous phases of the logic circuits coincide in time.

It is a further feature of this invention to prolong any phase in response to a "break" signal from the calling line so that additional code sentences are applied to the line.

The means for fulfilling the foregoing objects and the practical embodiment of the features of this invention will be fully understood from the following description taken in conjunction with the accompanying drawing wherein:

FIGS. 1–17, when arranged as shown in FIG. 18, show the details of circuits and equipment which cooperate to form an automatic test line in accordance with this invention; and FIGS. 19 and 20, when arranged as shown in FIG. 21, illustrate in block form the various equipment and circuits of the automatic test line and the manner in which they cooperate.

In several figures of the drawing, the relay contacts are shown detached from the relay winding. Contacts which are closed when the associated relay is de-energized, known as "break contacts," are represented by a single short line perpendicular to the conductor line, while contacts which are closed when the relay is energized, known as "make contacts," are represented by two short cross lines diagonally intersecting the conductor line. Each set of relay contacts is identified by the relay core designation together with an individual contact number.

*General Description*

Referring now to FIGS. 19 and 20, test line subset A, generally indicated by block 2001, and test line subset D, generally indicated by block 2002, are shown. It is to be understood, however, that any additional number of test line subsets may also be incorporated in the automatic test line. In addition, the automatic test line is provided with a plurality of test sentence subsets of which test sentence subset E, generally indicated by block 2003, and test sentence subset G, generally indicated by block 2004, are shown.

Extending to test line subset A is telephone line A, designated line 2011, which, in turn, is connected to a telephone central office. Test line subset A is arranged to operate in one of two modes, hereinafter identified as the originating mode and the terminating mode. In the terminating mode, test line subset A accepts frequency shift telegraph signals in a first frequency band from telephone line A and converts them to conventional D.-C. current signals and applies them to the output line 2021. Conversely, D.-C. signals applied to test line subset A from line 2031 are converted to frequency shift signals in a second frequency band for application to telephone line A. In the originating mode telephone line subset A converts signals from telephone line A in the second frequency band to D.-C. telegraph signals and, conversely, converts D.-C. signals to frequency shift signals in the first frequency band for application to telephone line A.

Similarly, test line subset D is connected to telephone line D indicated by line 2012 and is provided with signal input lead 2032 and signal output lead 2022. Test line subset D is arranged in substantially the same manner as test line subset A and is arranged to provide the same conversions in the two modes. Test sentence subset E and test sentence subset G are connected to telephone lines 2013 and 2014, respectively, and signal input leads 2033 and 2034. The test sentence subsets, however, only operate in the terminating mode.

Associated with test line subset A are sequence and control logic A circuitry, generally indicated by block 2041, and transmission gate A circuitry, generally indicated by block 2051. Similarly, associated with test line subset D, test sentence subset E and test sentence subset G are logic circuitry 2042 and gate 2052, logic circuitry 2043 and gate 2053, and logic circuitry 2044 and gate 2054.

Referring now to FIG. 19, test sentence generator, generally indicated by block 1901, is shown. Generator 1901 provides a source of successive test sentences and the output thereof is extended to gates 2051, 2052 and 2053 by way of leads 1911, 1921 and 1931, respectively. In addition, the ouput of generator 1901 is applied to distortion set 1904, which set converts the test sentence signals to disorted signals. The output of distortion set 1904 is extended to gate 2051, gate 2052, and gate 2054 by way of leads 1912, 1922 and 1941, respectively. Letters generator 1907 is also controlled by test sentence generator 1901 to generate periodic Letters signals. The output of generator 1907 is extended to gates 2051, 2052, 2053 and 2054 by way of leads 1914, 1924, 1933 and 1943, respectively. The automatic test line is also provided with test sentence instruction generator 1902 and an associated coding and control circuit, generally indicated by block 1905. Instruction generator 1902 is arranged, when activated by control circuit 1905, to generate three successive test sentence instructions each of which indicates the generation of a particular test sentence as described hereinafter. The output of generator 1902 is extended to gates 2051, 2052, 2053 and 2054 by way of leads 1913, 1923, 1932 and 1942, respectively. In addition, the automatic test line includes a phase 4 instruction generator, generally indicated by block 1903, and associated coding and control circuit, generally indicated by block 1906. The output of generator 1903 is extended to gate 2051 and gate 2052 by way of leads 1915 and 1925, respectively.

Assuming now that a call is received on telephone line 2011, test line subset A places telephone line 2011 in the off-hook condition to trip the ringing at the telephone central office, places itself in the terminating mode and advises logic circuit 2041 that a call has been received. Logic circuit 2041, in turn, signals coding and control circuit 1905 over common lead 2060. In the event that generator 1901 or generator 1902 is in the middle of a cycle, logic circuit 2041, in accordance with instructions from coding and control circuit 1905, enables lead 1914 to gate 2051 whereby Letters signals from generator 1907 are applied to telephone line 2011 by way of lead 2031, advising the calling subscriber of a momentary delay. Assuming, however, that the circuit is idle, or generators 1901 and 1902 are not in the middle of a cycle, coding and control circuit 1905 codes generator 1902 with an instruction sentence for a first interval in the cycle of generator 1902, indicating the subsequent transmission of an undistorted test sentence. In addition, coding and control circuit 1905 advises logic circuit 2041 of the initiation of the cycle whereby logic circuit 2041 steps to a first count, hereinafter referred to as phase 1, and enables input lead 1913 extending to gate 2051. Accordingly, the phase 1 test sentence instruction is applied to telephone line 2011 by way of gate 2051 and lead 2031. Coding and control circuit 1905 then codes generator 1902 with successive instruction sentences, designating the transmission of a distorted test sentence at a reduced level during the second and third intervals, respectively, of the cycle of instruction generator 1902. With logic circuit 2041 in phase 1, however, gate 2051 disables lead 1913 at the termination of the first interval, whereby the latter two instruction sentences are no applied to telephone line 2011.

After the termination of the third interval in the cycle of generator 1902, coding and control circuit 1905 awaits the termination of the cycle of test sentence generator 1901 and, at the termination thereof, signals logic circuit 2041 over lead 2061. With logic circuit 2041 in phase 1, transmission gate 2051 enables input lead 1911. Accordingly, during the next cycle of generator 1901 an undistorted test sentence is applied through gate 2051, lead 2031, and subset 2001 to telephone line 2011.

At the termination of the cycle of generator 1901, after the transmission of the undistorted test sentence, coding and control circuit 1905 again codes test sentence instruction generator 1902 to send the three successive instruction sentences. In addition, coding and control circuit 1905 again signals logic circuit 2041 whereby logic circuit 2041 steps to the phase 2 condition. In the phase 2 condition, logic circuit 2041 controls gate 2051 to enable lead 1913 during the second interval of the cycle of generator 1902, whereby the instruction sentence advising the transmission of a distorted test sentence is applied to telephone line 2011. At the conclusion of the cycles of generators 1901 and 1902, coding and control circuit 1905 again signals logic circuit 2041 and logic circuit 2041, in turn, enables input lead 1912 to gate 2051, whereby, during the next cycle of generator 1901, a distorted test sentence is applied to telephone line 2011.

At the conclusion of the cycle of generator 1901, coding and control circuit 1905 signals logic circuit 2041, advancing the latter circuit to phase 3. In phase 3, logic circuit 2041 arranges gate 2051 to enable input lead 1913 during the third interval of the cycle of generator 1902. Accordingly, during phase 3, the instruction sentence advising the transmission of distorted signals at a reduced level is applied to telephone line 2011. In addition, during phase 3, logic circuit 2041 instructs subset A to insert an impedance in the transmitting branch to reduce the signal output level. At the conclusion of the cycles of generators 1901 and 1902, coding and control circuit 1905 again signals logic circuit 2041 which enables input lead 1912. Accordingly, during the next cycle of generator 1901, a distorted test sentence at a reduced level is applied to telephone line 2011.

In the event that the calling subscriber desires to receive additional test sentences during any one of the three phases, a "break" signal is transmitted during the test sentence transmission. Subset A responds to the break signal by blinding logic circuit 2041 to signals from control circuit 1905 whereby logic circuit 2041 is maintained in its present phase and the test sentence is continuously transmitted to telephone line 2011. To terminate the continuous test sentence transmission, another "break" signal is sent. This removes the blind on logic circuit 2041 rendering it again responsive to the control circuit 1905 signal at the conclusion of the cycle of generator 1901 whereby logic circuit 2041 advances to the next successive phase and the sequential operation resumes.

After the transmission of the test sentence for the third phase, coding and control circuit 1905 signals logic circuit 2041 and then retires. This now advances logic circuit 2041 to phase 4 wherein it requests service from contention circuit 2062. In the event that another subset is in phase 4, contention circuit 2062 arranges gate 2051 to enable input lead 1914 whereby Letters signals are applied to the telephone line 2011 to advise the calling subscriber of a momentary delay.

Assuming that no other subset is in phase 4 or that subset A obtains priority over other subsets simultaneously requesting service from contention circuit 2062, contention circuit 2062 instructs receiving gate 2063 to extend signals from subset A output signal line 2021 to common signal line 2065. In addition, contention circuit 2062 arranges gate 2051 to extend signals from input line 1915 to line 2031. With the seizure of contention circuit 2062 by subset A, coding and control circuit 1906 is signaled over line 2064 to initiate the first sequence of phase 4 instruction generator 1903. In addition, flip circuit 1950 and disconnect circuit 1951 are instructed by contention circuit 2062 to selectively enable output leads 1952 and 1953, respectively, which leads extend by way of common lead 1954 to test line subset A.

With coding and control circuit 1906 activated for the first cycle, instruction generator 1903 is coded to send an instruction sentence advising the calling subscriber to transmit a series of teletypewriter characters and instruction generator 1903, in turn, transmits the sentence through lead 1915, which was previously enabled, gate 2051, and lead 2031 to subset A where it is converted to frequency shift signals for application to telephone line 2011. At the termination of the instruction sentence, the test line circuit stops and awaits the response from the calling subscriber.

When the teletypewriter signals are received from the calling subscriber, test line subset A applies the signals through lead 2021, receiver gate 2063 and lead 2065 to distortion indicating circuit 1908. Distortion indicating circuit 1908, in turn, advises coding and control circuit 1906 whether or not the teletypewriter characters are distorted. Accordingly, after transmission stops, coding and control circuit 1906 restarts instruction generator 1903 coding the generator with a first instruction sentence, indicating that the received signals are distorted, or a second instruction sentence, indicating that the received signals are undistorted, in accordance with the signal received from the distortion indicating circuit 1908. Accordingly, generator 1903 proceeds through a second cycle advising the calling subscriber of the quality of his transmitted signals.

At the termination of the second cycle of instruction generator 1903, coding and control circuit 1906 recodes generator 1903 with an instruction sentence advising the remote subscriber to transfer from the originating mode to the terminating mode. At the termination of the third cycle, coding and control circuit 1906 conditions flip circuit 1950 and the test line circuit stops and awaits the response of the calling subscriber.

The calling subscriber initiates the "flip" sequence by sending a disconnect signal. This signal is received by test line subset A and applied to lead 2065, as previously described, and is then applied to flip circuit 1950 whereupon flip circuit 1950 signals test line subset A through enabled lead 1952 and lead 1954 to flip from the terminating mode to the originating mode. During the flip sequence of test line subset A, logic circuit 2041 is restored to the initial condition whereby the contention is removed from contention circuit 2062.

At the conclusion of the flip sequence of test line subset A, a new calling condition is presented to sequence and logic circuit 2041. This, in turn, activates coding and control circuit 1905 in the same manner as previously described. Accordingly, the automatic test line proceeds through the first three phases, sending instruction sentences and test sentences to telephone line 2011 in the same manner as previously described with the exception that the frequency shift signals applied to telephone line 2011 are in the first frequency band. At the conclusion of the three phases, logic circuit 2041 again requests service from contention circuit 2062 and advances through the fourth phase in the event that no other subset has obtained priority. Accordingly, the remote subscriber is again advised to transmit teletypewriter characters, which characters are now transmitted in the second frequency band, converted to the conventional D.-C. telegraph signals, and applied to distortion indicating circuit 1908. Instruction generator 1903 then advises the calling subscriber whether his transmission was within limits and, at the conclusion thereof, coding and control circuit 1906 codes instruction generator 1903 with the instruction sentence advising the remote subscriber that the test sequence is over. At the conclusion of this third cycle, coding and control circuit 1906 activates disconnect circuit 1951 whereby disconnect circuit 1951 signals test line subset A by way of enabled lead 1953 and lead 1954 to initiate the disconnect sequence. Test line subset A, in turn, removes the off-hook condition from telephone line 2011, restores logic circuit 2041 to the initial idle condition, and logic circuit 2041 removes the contention applied to contention circuit 2062. This restores the automatic test line to the initial idle condition.

Assuming now that another test line subset, such as subset D, is called at substantially the same time as subset A is called, test line subset D places the telephone line 2012 in the off-hook position, places itself in the terminating mode, and advises logic circuit 2042 that a call has been received. Logic circuit 2042 then signals coding and control circuit 1905 which signal is presumed to occur substantially simultaneously with the signal received from logic circuit 2041. In this event, the output of generator 1902 is applied in parallel to lines 1913 and 1923, the output of generator 1901 is applied in parallel to leads 1911 and 1921 and the output of distorting set 1904 is applied in parallel to leads 1912 and 1922 whereby the two calling subscribers advance through the first three phases simultaneously. It is recalled, however, that only one subset may be in phase 4. Accordingly, assuming that subset D obtains priority, Letters signals are applied to telephone line 2011, as previously described, until logic circuit 2042 removes the contention from contention circuit 2062 whereupon subset A may proceed through phase 4.

Assuming now that a call is received from telephone line 2012 while subset A is in phase 1, in this event Letters signals are transmitted to line 2012 until the phase is completed whereupon input lead 1923 to gate 2052 is enabled for the first phase of subset D. Since subset A is now in the second phase, it is apparent that the first test sentence instruction is transmitted to telephone line 2012 and the second test sentence instruction is transmitted to line 2011. In addition, during the transmission of the test sentence, since input lead 1921 to gate 2052 is enabled during the first phase of subset D and input lead 1912 to gate 2051 is enabled during the second phase of subset A, and undistorted test sentence is applied to telephone line 2012 simultaneously with the application of a distorted test sentence to telephone line 2011. Accordingly, each of the test line subsets may be simultaneously in different phases and two or more of the subsets may be simultaneously in the same phase with the above-noted exception of phase 4.

The test sentence subsets are utilized to provide a continuous source of test sentences. Assuming a call is received on line 2013, test sentence subset E places telephone line 2013 in the off-hook condition and advises logic circuit 2043 that a call has been received. Logic circuit 2043 signals coding and control circuit 1905 whereby test sentence instruction generator 1902 is started in substantially the same manner as previously described for the test line subsets. Logic circuit 2043, however, is arranged to be maintained in only one phase. Assuming that logic circuit 2043 is arranged to be in phase 1, the first test sentence instruction generated by generator 1902 is applied to telephone line 2012 by way of lead 1932, gate 2053, signal input lead 2033, and subset 2003. After the generation of the three instruction sentences by generator 1902, the output of generator 1901 is extended through lead 1931 to signal input lead 2033 whereby the undistorted test sentence is applied to telephone line 2013. Since logic circuit 2043 is maintained in phase 1, however, the circuit is unresponsive to the signal from the coding and control circuit 1905 at the termination of the test sentence. Accordingly, the connection from the output of generator 1901 to test sentence subset E is maintained whereby a continuous source of test sentence signals is applied to telephone line 2013. When the calling subscriber no longer desires to receive the test sentence signals, he initiates the disconnect sequence which restores test sentence subset E and logic circuit 2043 to the initial idle condition. This disables input lead 1931 to gate 2053 and restores telephone line 2013 to the on-hook condition.

Test sentence subset G is substantially identical to test sentence subset E with the exception that an impedance network is provided in the transmitting branch of test sentence subset G. In addition, logic circuit 2044 is substantially identical to logic circuit 2043 with the exception that logic circuit 2044 is maintained in the third phase. Accordingly, in response to a call from telephone line 2014, the third test sentence instruction is applied thereto by way of lead 1942 followed by a continuous source of distorted test sentence signals by way of lead 1941, which signals are reduced in level by the impedance circuit in the terminating branch of test sentence subset G. Accordingly, telephone line 2014 is called if it is desired to receive a continuous source of distorted signals at a reduced level.

*Detailed Description*

Figure 13:
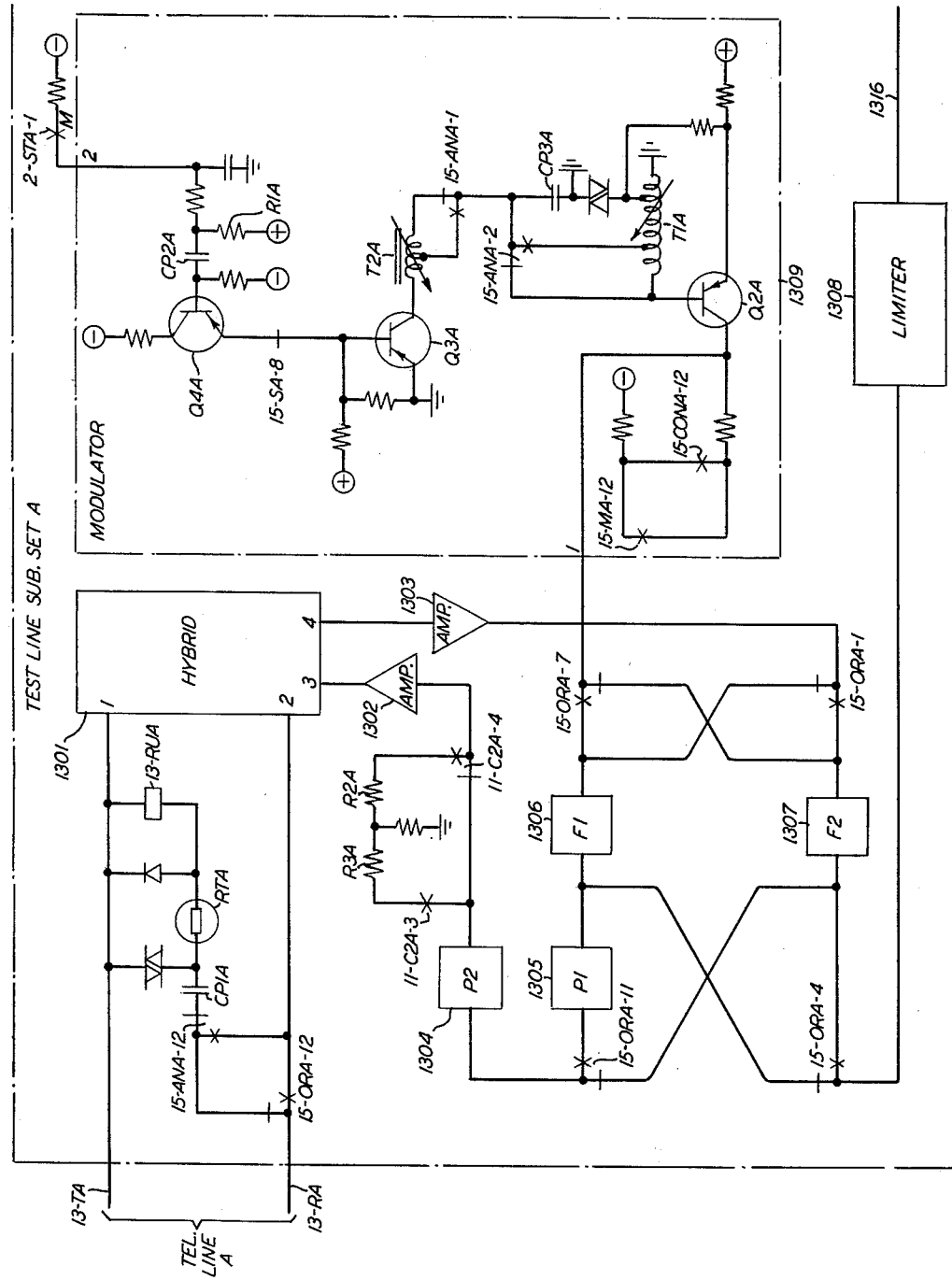
Figure 14:
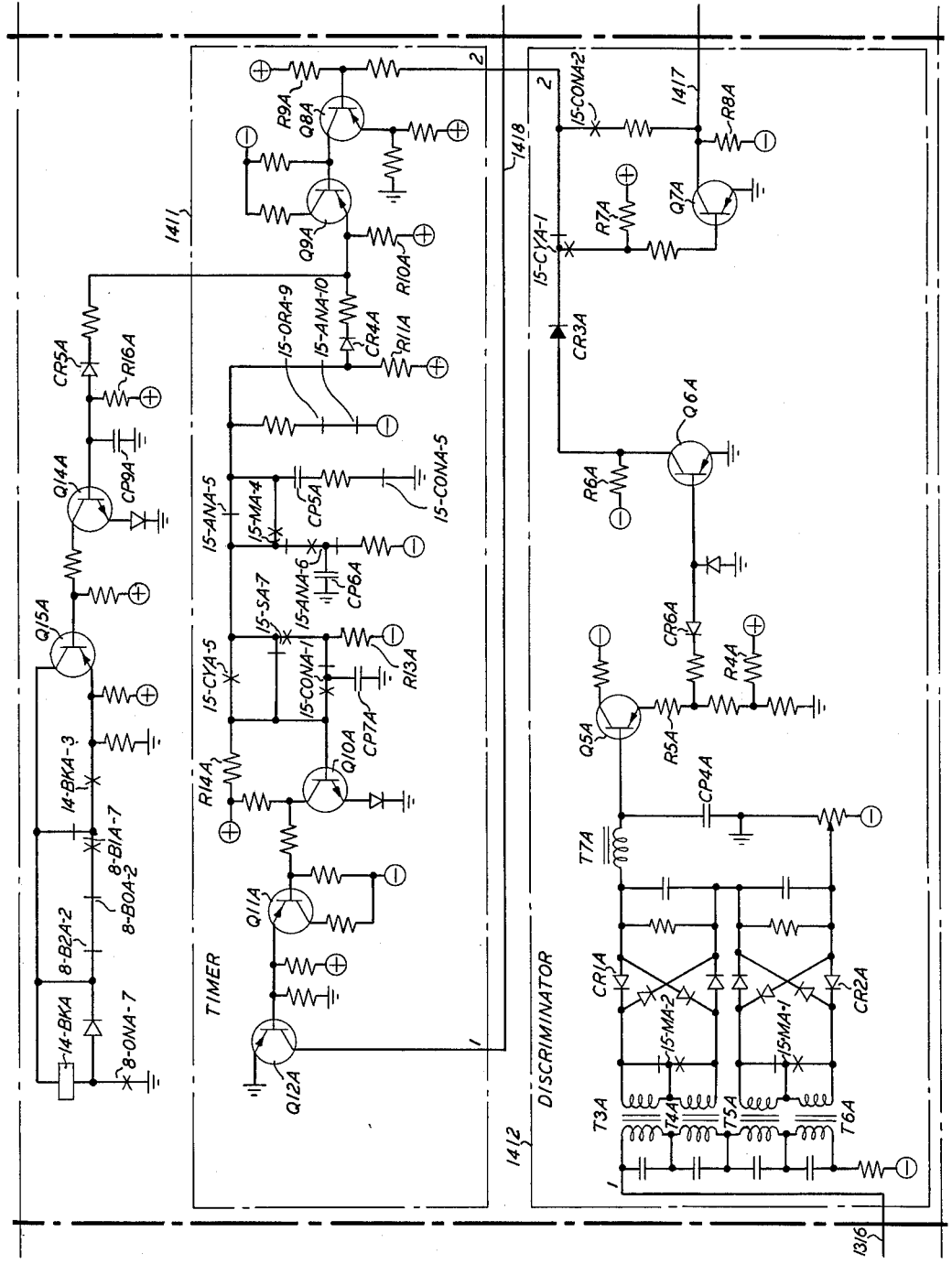
Figure 16:
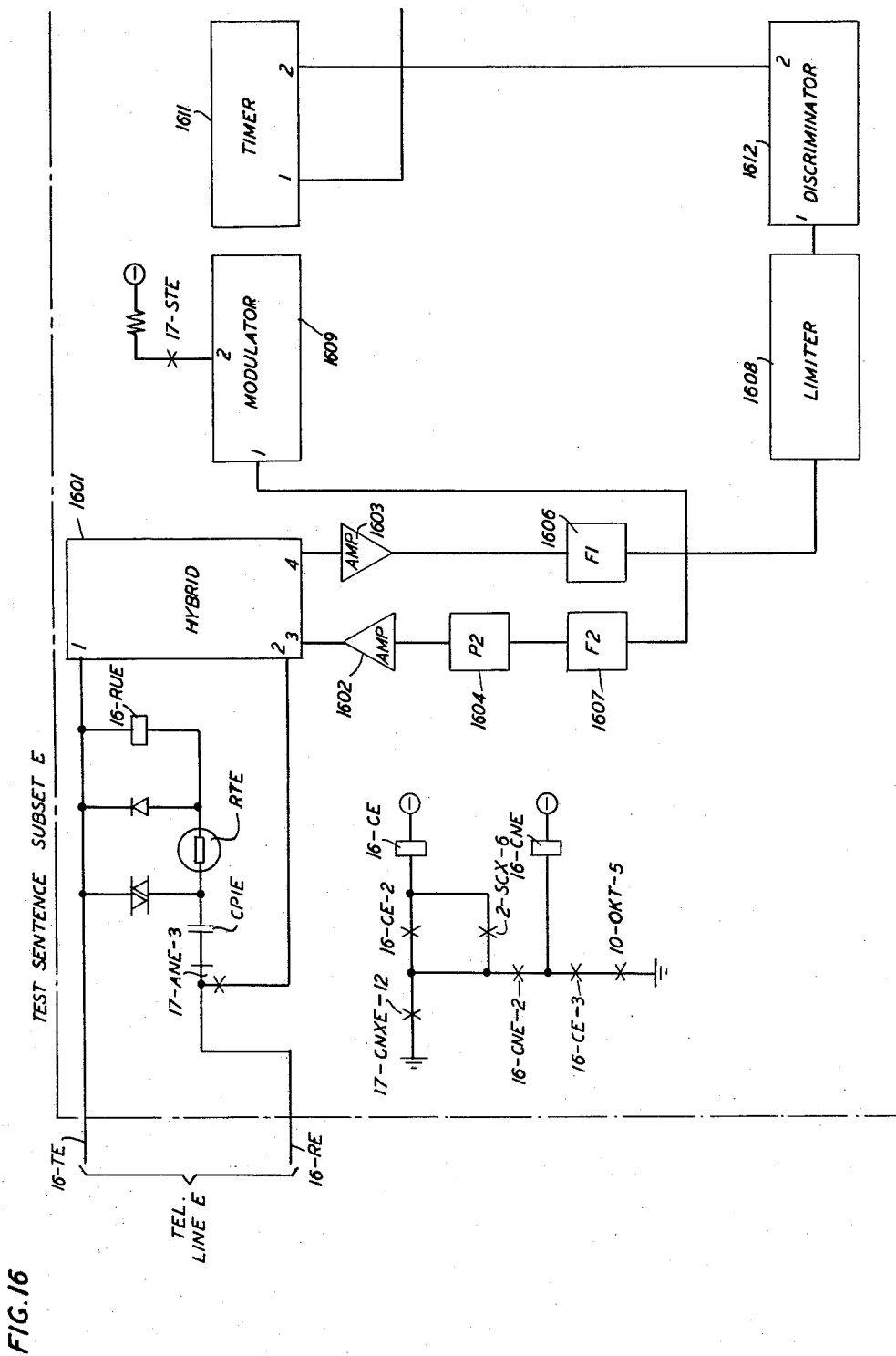

Referring now to FIG. 13, telephone line A comprising tip lead 13–TA and ring lead 13–RA extends to test line subset A which subset is shown in FIGS. 13 and 14 and a portion of FIG. 15. Similarly, telephone line B, FIG. 15, which includes tip lead 15–TB and ring lead 15–RB extends to test line subset B; telephone line C which includes tip lead 15–TC and ring lead 15–RC extends to subset C; and telephone line D which includes tip lead 15–TD and ring lead 15–RD extends to test line subset D. Telephone line E, FIG. 16, which includes tip lead 16–TE and ring lead 16–RE extends to test sentence subset E which subset is shown in FIG. 16 and a portion of FIG. 17. Similarly, telephone line F which includes tip lead 17–TF and ring lead 17–RF extends to test sentence subset F; and telephone line G which includes tip lead 17–TG and ring lead 17–RG extends to test sentence subset G.

*Test Line Subset*

Test line subset A generally includes hybrid 1301, amplifiers 1302 and 1303, pads 1304 and 1305, $F_1$ filter 1306, $F_2$ filter 1307, limiter 1308 and modulator 1309 as shown in FIG. 13. In addition, test line subset A is provided with discriminator 1412, FIG. 14, timer 1411, keyer 1514, FIG. 15, and appropriate relay control circuits, FIGS. 14 and 15, which will be described hereinafter. It is noted that test line subset A is similar to the remote subscriber data set which is disclosed in the above-identified application of T. L. Doktor et al. In addition, subset B, subset C and subset D are substantially identical to test line subset A with the exception that the designation of the components in test line subset A terminating with the letter A are terminated with the letter B in subset B, with the letter C in subset C, and with the letter D in subset D.

During the normal idle marking condition marking contacts 2–STA–1 of polar relay 2–STA are closed whereby negative battery is applied therethrough to the righthand plate of capacitor CP2A as shown in FIG. 13. Since the left-hand plate of capacitor CP2A is connected to the base of the transistor Q4A and the junction of the base of transistor Q4A and capacitor CP2A is connected to negative battery, transistor Q4A is turned ON during the idle marking condition. Therefore, negative battery is applied by way of the collector-to-emitter path of transistor Q4A and break contacts 15–SA–8 to the base of transistor Q3A. Accordingly, in the marking condition transistor Q3A is conducting.

Assuming that the test line subset is in the originating mode whereby relay ANA is released, as described hereinafter, the base of oscillator transistor Q2A is connected to ground by way of the break contacts of contacts 15–ANA–2, the break contacts of contacts 15–ANA–1, inductor T2A and the collector-to-emitter path of transistor Q2A. If the subset is in the terminating mode, relay 15–ANA is operated whereby ground is connected to the base of transistor Q2A by way of a portion of inductor T1A to an intermediate tap thereon and then via the make contacts of contacts 15–ANA–2 and 15–ANA–1, a portion of inductor T2A from the intermediate tap on the inductor to the collector of transistor Q3A, and then by way of the emitter of the transistor to ground.

If a spacing signal is being transmitted, marking contacts 2–STA–1 are open, as described hereinafter, removing the negative battery applied to capacitor CP2A. This results in the application of a positive potential to capacitor CP2A by way of resistor R1A whereby a positive going voltage pulse transmitted through capacitor CP2A cuts off transistor Q4A. When transistor Q4A ceases to conduct, the negative voltage which was keeping transistor Q3A on is removed and transistor Q3A becomes an open circuit because of the positive voltage back bias provided to its base. Thus keyer transistor Q3A either places inductor T2A in series between ground and the base of transistor Q2A or removes inductor T2A, depending upon whether marking contacts 2–STA–1 are closed or open, corresponding respectively to the mark or space condition to be transmitted.

Transistor stage Q2A comprises an oscillator with the tank circuit including inductor T1A and capacitor CP3A. The basic frequency of this oscillator with relay 15–ANA released is controlled to oscillate in the $F_1$ band. With relay 15–ANA operated, the amount of inductance across capacitor CP3A is reduced, as previously described, resulting in a basic frequency in the higher $F_2$ band. In addition, when marking contacts 2–STA–1 are closed, corresponding to a marking signal, transistor Q3A is conducting and the oscillator tank is shunted by inductor T2A reducing the effective inductance and causing the oscillator to oscillate at a higher frequency in the basic frequency band. This corresponds to the frequency which is chosen to represent the marking condition. Conversely, when marking contacts 2–STA–1 are open, corresponding to a spacing signal, inductor T2A is removed from the tank circuit whereby the frequency is decreased in the basic frequency band. This corresponds to the spacing frequency.

The collector of transistor Q2A is connected to negative battery through make contacts 15–MA–12 and make contacts 15–CONA–2 which contacts are closed at appropriate times in the control frequency to start the oscillator, as described hereinafter. The output of the oscillator is taken from the collector of transistor Q2A and proceeds through the appropriate filter and amplifier to hybrid circuit 1301.

Two filters are provided comprising a bandpass filter for the $F_1$ band, generally indicated by block 1306, and bandpass filter for the $F_2$ band, generally indicated by block 1307. When the subset is in the originating mode, relay 15–ANA is released and relay 15–ORA is operated, as described hereinafter. The oscillator is tuned to the $F_1$ band, $F_1$ filter 1306 is put in the transmitting branch and $F_2$ filter 1307 in the receiving branch. For this case the output of the oscillator is connected through the make contacts of contacts 15–ORA–7, $F_1$ filter 1306, pad 1305, the make contacts of contacts 15–ORA–11, pad 1304, the break contacts of contacts 11–C2A–4 and amplifier 1302 to input terminal 3 of hybrid 1301.

Level adjustment pads 1304 and 1305 provide adjustment of the send level as is well known in the art. It will be recalled that the $F_2$ band has a higher frequency than the $F_1$ band, whereby it may be desirable to transmit the $F_2$ band at a higher level. Amplifier 1302 is a power stage suitable to provide sufficient signal to drive the line and isolate the line from the bandpass filter. Hybrid 1301 provides isolation between the output of amplifier 1302 and the input of amplifier 1303 from terminal 4 of hybrid 1301. As is well known in the art, a signal applied to input terminal 3, for example, of hybrid 1301 is applied across output terminal 2 and output terminal 1, and isolated from output terminal 3 of hybrid 1301. The output from terminals 1 and 2 of hybrid 1301 proceeds to the tip lead 13–TA and ring lead 13–RA by way of the make contacts of contacts 15–ANA–12 or contacts 15–ORA–12.

As previously described, the tip and ring terminals are connected to terminals 1 and 2, respectively, of hybrid coil 1301 whereby an incoming signal is fed through buffer amplifier 1303 to contacts 15–ORA–1. If the subset is in the originating mode, relay 15–ORA is operated and the signal is applied by way of the make contacts of contacts 15–ORA–1, $F_2$ filter 1307, and the make contacts of contacts 15–ORA–4 to the input of limiter 1308. If the stage is in the terminating mode, relay 15–ORA is released and the signal is applied by way of the break contacts of contacts 15–ORA–1, $F_1$ filter 1306 and the break contacts of contacts 15–ORA–4 to the input of limiter 1308. Limiter 1308, which is well known in the art, provides a limiting action for any signal which exceeds a predetermined amplitude. The output of limiter 1308 is fed to input terminal 1 of discriminator 1412 by way of lead 1316.

Discriminator 1412, which consists of four parallel tuned circuits in series composed of inductors T3A, T4A, T5A and T6A and the capacitors in shunt thereto, as shown in FIG. 14, is driven by the output of limiter 1308 by way of lead 1316. The secondaries of the inductors are selected in pairs by means of contacts 15–MA–1 and 15–MA–2 which short circuit the undesired secondaries. With a short circuited secondary in one of the tuned circuits, the primary circuit resonance for that circuit is shifted sufficiently high in frequency so as to have no influence on the resonance of the remaining coils.

If the subset is in the terminating mode, relay 15–MA is operated, as described hereinafter, and the secondary of inductors T4A and T6A are short circuited. With the tuned circuits including inductors T3A and T5A active, the discriminator will have the normal S-shaped curve effective in demodulating the $F_1$ frequency band, whereby the space frequency excites the diode bridge which includes diode CR1A and the mark frequency excites the diode bridge which includes diode CR2A. If the subset is in the originating mode, relay 15–MA is released and the secondaries of inductors T3A and T5A are short circuited. In this case, the tuned circuits which include inductors T4A and T6A are rendered active, and the discriminator is tuned to the $F_2$ band.

Since the diode bridges are oppositely poled, a mark frequency coming into discriminator 1412 develops a positive voltage and a space frequency coming into discriminator 1412 develops a negative voltage. These signals are fed through the low pass filter comprising inductor T7A and shunting capacitor CP4A to the base of transistor amplifier stage Q5A.

Transistor Q5A is an emitter follower with load resistor R5A in transistor Q5A emitter circuit. The application of a negative spacing signal to the base of transistor Q5A provides a negative signal across resistor R5A, which negative signal is applied by way of diode CR6A to the base of transistor Q6A. Conversely, the positive marking signal applied to the base of transistor Q5A precludes the application of the negative signal across load resistor R5A and the resultant application of positive battery by way of resistor R4A to diode CR6A removes the negative signal applied to the base of transistor Q6A.

The collector output of transistor Q6A is connected through Zener diode CR3A to relay contacts 15–CYA–1. Before relay 15–CYA operates, the output of transistor Q6A is fed through the break contacts of contacts 15–CYA–1, output terminal 2 of discriminator 1412, and input terminal 2 of timer 1411 to the base of transistor Q8A. With this connection, positive battery is applied to the base of transistor Q8A by way of resistor R9A when the collector of transistor Q6A is in the spacing ground condition. When the collector of transistor Q6A goes to the negative marking condition, Zener diode CR3A breaks down and the negative collector potential is applied to the base of transistor Q8A.

After relay 15–CONA, together with relay 15–CYA, operates, as described hereinafter, the collector output of transistor Q6A is connected through diode CR3A and the make contacts of contacts 15–CYA–1 to the input of transistor Q7A. Accordingly, with this connection a marking signal produces a negative voltage and a spacing signal produces a positive voltage at the base of transistor Q7A. When the base of transistor Q7A goes negative, it conducts causing current to flow from ground through the emitter-to-collector path of transistor Q7A to the input of keyer 1514 by way of lead 1417. As disclosed in detail in the above-identified application of T. L. Doktor et al., this current flowing into the keyer circuit 1515 results in the application of current through output leads 15–T3A and 15–T4A and thus through receiving relay 11–REC, as described hereinafter.

When transistor Q7A is cut off by a spacing signal, its collector goes negative due to battery applied by way of resistor R8A. Since relay 15–CONA–2 is operated, this negative voltage is fed through make contacts 15–CONA–2 to the base of transistor Q8A. Prior to the operation of relays 15–CYA and 15–CONA, transistor Q6A applies negative signals corresponding to marking signals and positive signals corresponding to spacing signals to timer transistor Q8A. Following the operation of relays 15–CONA and 15–CYA, transistor Q8A is connected to the collector of transistor Q7A providing a logical inversion. At this point, the application of negative voltage thereto corresponds to a spacing condition and a positive voltage corresponds to a marking condition.

The timer circuit includes transistor stages Q8A, Q9A, Q10A, Q11A and Q12A. The timer performs several different functions depending upon the mode of operation of the data set. If the data set is in the answer mode of operation, the timing circuit will initially time for a period of about one second comprising a guard interval. During this interval, the data set does not transmit any signal toward the remote subscriber subset. Following this interval the timer is switched to monitor for continuous marking frequency from the subscriber set and will time out after approximately one second of such marking signal. Once the marking signal time out has occurred, relays 15–CONA and 15–CYA operate, tranferring the input of the timing circuit to the output of transistor Q7A in the discriminator, as previously described. The timer then monitors for the reception of a spacing signal.

If the subset is in the originating mode of operation, the timing circuit will not time for the guard interval but will first look for the marking signal from the subscriber subset. At the expiration of approximately one second of such marking signal, the timing circuit will transfer to a monitor spacing condition in substantially the manner as previously described for the terminating mode.

When the timing circuit is monitoring for the reception of a marking signal, the output of transistor stage Q6A is connected to the base of transistor Q8A as previously described. A spacing signal from the line causes transistor Q6A to conduct connecting ground at the emitter through to the collector and to the base of transistor Q8A so that transistor Q8A is biased off. When transistor Q8A is turned OFF, the negative potential applied to the base of transistor Q9A renders it conducting and a negative potential is applied through its collector to its emitter. This negative potential at the emitter of transistor Q9A is further applied by way of diode CR4A to the upper plate of capacitor CP5A, as shown in FIG. 14. Capacitor CP5A, in turn, is connectable to the base of transistor Q10A by way of the break contacts of contacts 15–ANA–5 or the make contacts of contacts 15–MA–4 in shunt thereto and the break contacts of the contacts 15–SA–7. Accordingly, as long as transistor Q9A is conducting, a negative voltage is maintained across capacitor CP5A and the base of transistor Q10A is held negative and therefore transistor Q10A is non-conducting.

When a marking signal is received from the subscriber subset, transistor Q6A turns OFF, applying negative battery through resistor R6A to Zener diode CR3A. This results in the breakdown of diode CR3A whereby the base of transistor Q8A is rendered negative. The negative going signal causes transistor Q8A to conduct driving the base of transistor Q9A positive, whereby transistor Q9A turns OFF. This removes the negative potential from diode CR4A whereby it ceases to conduct and a charging path is established for capacitor CP5A toward positive battery through resistor R11A and through resistor R14A. Accordingly, capacitor CP5A will charge slowly until the base of transistor Q10A goes slightly positive rendering the transistor conductive.

When transistor Q10A conducts, the potential at the base of transistor Q11A is driven in a negative direction rendering the transistor conductive. Since the emitter of transistor Q11A is connected to the base of transistor Q12A the potential at the base of transistor Q12A, in turn, is driven in a negative direction, rendering the transistor Q12A conductive. When transistor Q12A conducts, the ground at its emitter is conducted through its collector operating relay 15–CONA which, in turn, operates relay 15–CYA, as described hereinafter. Accordingly, the reception of a continuous mark of about one second turns ON transistor Q12A to operate relay 15–CONA.

The operation of relays 15–CONA and 15–CYA results in the signal inversion whereby a negative going signal at the base of transistor Q8A corresponds logically to a spacing signal rather than a marking signal. Accordingly, the timer now monitors for spacing signals and transistor Q8A will be turned ON by such signals and will be turned OFF by marking signals.

As mentioned above, the operation of relay 15–CONA operates relay 15–CYA. The closure of the make contacts of contacts 15–CONA–1 connects timer capacitor CP7A into the timing circuit. In addition, the operation of relay 15–CONA opens break contacts 15–CONA–5 whereby timer capacitor CP5A is disconnected from the timing circuit. Spacing signals will then be monitored by the timer and will result in charging capacitor CP7A toward positive battery by way of resistor R11A and resistor R14A. In this case a continuous spacing signal of about one second will result in biasing the base of transistor Q10A positive causing the transistor to conduct. When transistor Q10A conducts, transistor Q11A and transistor Q12A will, in turn, be turned ON.

When a call is received by the subset, relay 15–ANA is operated, as described hereinafter, and the subset is placed in the terminating mode. In the terminating mode the above described timing sequence is used with the exception that there is an additional timing interval of about one second which is introduced prior thereto. This extra interval is a period of no transmission and is identified above as the guard interval.

The operation of relay 15–ANA opens break contact 15–ANA–5 opening the previously described path for monitoring marking between the base of transistor Q10A and timing capacitor CP5A. In addition, 15–ANA operated closes the make contacts 15–ANA–6 connecting the base of transistor Q10A to guard timing capacitor CP6A by way of the break contacts of contacts 15–MA–4. Capacitor CP6A charges toward positive battery through resistor R14A until the base of transistor Q10A becomes positive. When transistor Q10A conducts, transistors Q11A and Q12A conduct. The consequent application of ground to the collector of transistor Q12A operates relay 15–MA, as described hereinafter. Relay 15–MA operated disconnects timer capacitor CP6A from the timer circuit by opening the break contacts of contacts 15–MA–4 and reconnects timer capacitor CP5A into the timing circuit by closing the make contacts of contacts 15–MA–4. The timer is now monitoring for the reception of a continuous marking signal of approximately one second. The further operation of the timer circuit is identical with the operation as described above for the monitoring of the marking signal followed by the monitoring of the spacing signal.

When a calling subscriber dials the automatic telephone line, the telephone switching office selects telephone line A, for example, and applies ringing across the line. This ringing signal accordingly is applied from lead 13–RA through the break contacts of contacts 15–ORA–12, the break contacts of contacts 15–ANA–12, capacitor CP1A, thermistor RTA and the winding of relay 13–RUA to tip lead 13–TA. Accordingly, relay 13–RUA will operate and complete a path from ground by way of break contacts 15–CYA–4, FIG. 15, make contacts 13–RUA–11, the winding of relay 15–ANA and the break contacts of contacts 15–SA–9 to negative battery operating relay 15–ANA which locks by way of make contacts 15–ANA–4. This operation of relay 15–ANA places the subset in the terminating mode of operation.

Relay 15–ANA operated completes a low impedance path from ring lead 13–RA to tip lead 13–TA by way of the break contacts of contacts 15–ORA–12, the make contacts of contacts 15–ANA–12 and hybrid 1301 whereby an off-hook condition is presented to the central telephone office and the ringing is tripped. Signals from telephone line A are also applied by way of hybrid 1301 through its output terminal 4 to amplifier 1303. Since relay 15–ORA is released, the incoming signals are thereby passed through $F_1$ filter 1306 and limiter 1308 through discriminator 1412, as previously described. Relay 15–ANA operated extends the base of oscillator transistor stage Q2A to the collector of transistor Q3A by way of intermediate taps of inductors T1A and T2A whereby, as previously described, signal transmission is provided in the $F_2$ band. Relay 15–ANA operated also removes a negative disabling potential applied to timer capacitor CP5A by way of break contacts 15–ANA–10 and 15–ORA–9. In addition, the opening of break contacts 15–ANA–5 disconnects capacitor CP5A from the base of transistor Q10A. Relay 15–ANA operated also connects the base of transistor Q10A to the guard interval timer capacitor CP6A, as previously described. In addition, relay 15–ANA operated connects the collector of the timer output transistor Q12A to the winding of relay 15–MA by way of lead 1418, the break contacts of contacts 15–ORA–8, make contacts 15–ANA–9 and the break contacts of contacts 15–MA–5.

At the expiration of the guard interval transistor Q12A is turned ON, as previously described, and the collector current operates relay 15–MA which locks by way of the make contacts of contacts 15–MA–5 and the make contacts of contacts 15–ANA–7. Relay 15–MA operated opens the previously described connection of guard interval timer capacitor CP6A to the base of transistor Q10A by way of the make contacts of contacts 15–MA–4 whereby timer 1411 looks for a marking signal as previously described. Relay 15–MA operated closes the previously described shunts across inductors T4A and T6A and opens the shunts across inductors T3A and T5A whereby discriminator 1412 responds to the signals in the $F_1$ band. In addition, relay 15–MA operated extends the collector of transistor Q12A through lead 1418, the break contacts of contacts 15–ORA–8, make contacts 15–MA–10, break contacts 15–SA–1 and the break contacts of contacts 15–CONA–6 to the winding of relay 15–CONA. Finally, relay 15–MA completes the previously described path extending negative battery to the collector of transistor Q2A whereby modulator 1309 transmits marking in the $F_1$ band to telephone line A, as previously described.

As disclosed in the above-identified T. L. Doktor et al. case, the subscriber set looks for a marking signal of at least one second in duration and responds thereto by sending back a marking signal. This signal is received through telephone line A and applied to discriminator 1412. Transistor Q6A is turned OFF in response to the marking signal whereby a negative potential is applied to the base of transistor Q8A by way of Zener diode CR3A, as previously described. Transistor Q8A turns ON, turning OFF, in turn, transistor Q9A whereby diode CP4A is rendered non-conductive and capacitor CP5A slowly charges until transistor Q10A turns ON. This turns ON in succession transistors Q11A and Q12A and the consequent collector current of transistor Q12A operates relay 15–CONA which locks by way of the make contacts of contacts 15–CONA–6 and 15–ANA–7.

Relay 15–CONA operated completes an operating path for relay 15–CYA by way of make contacts 15–CONA–4 and break contacts 15–SA–5. With relays 15–CONA and 15–CYA operated, the collector output of transistor Q6A is extended to the base of transistor Q7A by way of the make contacts of contacts 15–CYA–1 and the collector output of transistor Q7A is extended to the base of transistor Q8A by way of make contacts 15–CONA–2. Accordingly, timer 1411 is now arranged to look for spacing signals. Relay 15–CONA operated opens a path extending the lower plate of timing capacitor CP5A to ground, removing the capacitor from the timing circuit and introducing timing capacitor CP7A by way of the make contacts of contacts 15–CONA–1. In addition, relay 15–CONA operated completes a supplemental path from the collector transistor Q2A to negative battery by way of make contacts 15–CONA–12. Relay 15–CYA operated extends the collector of transistor Q12A to the winding of relay 15–SA by way of the make contacts of contacts 15–CYA–3. Finally, relay 15–CONA completes an operating path for relay 8–CNXA by way of the make contacts of contacts 15–CONA–10 and break contacts 12–DISA–10.

*Undistorted Test Sentence Transmission—Phase One*

At the remote subscriber set the transmission of the marking signal indicates that it is prepared to receive message signals. The operation of relay 8–CNXA which occurs upon the reception of the marking signal, initiates the action to send the instruction and test signals to the subscriber.

Figure 1:
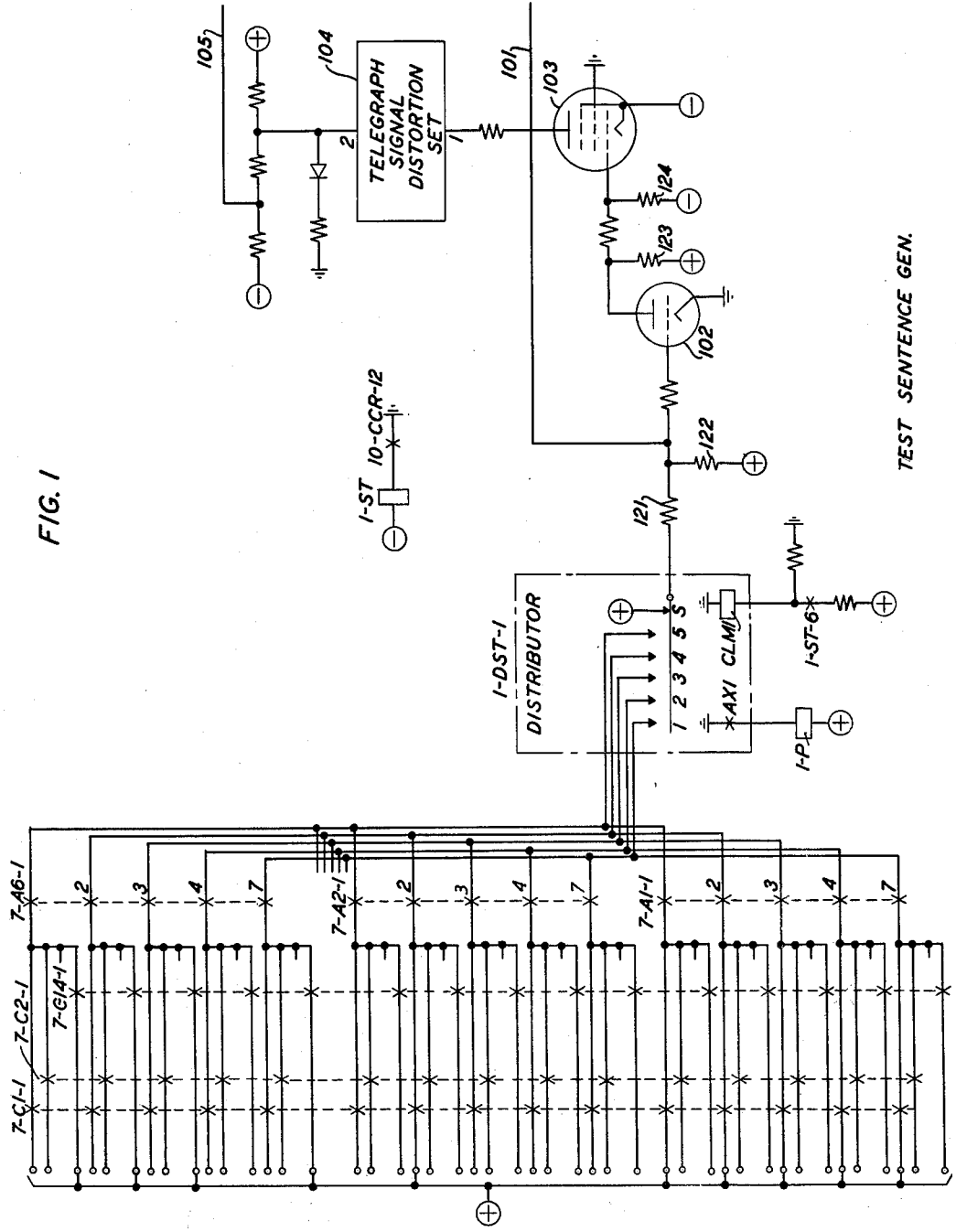
Figure 7:
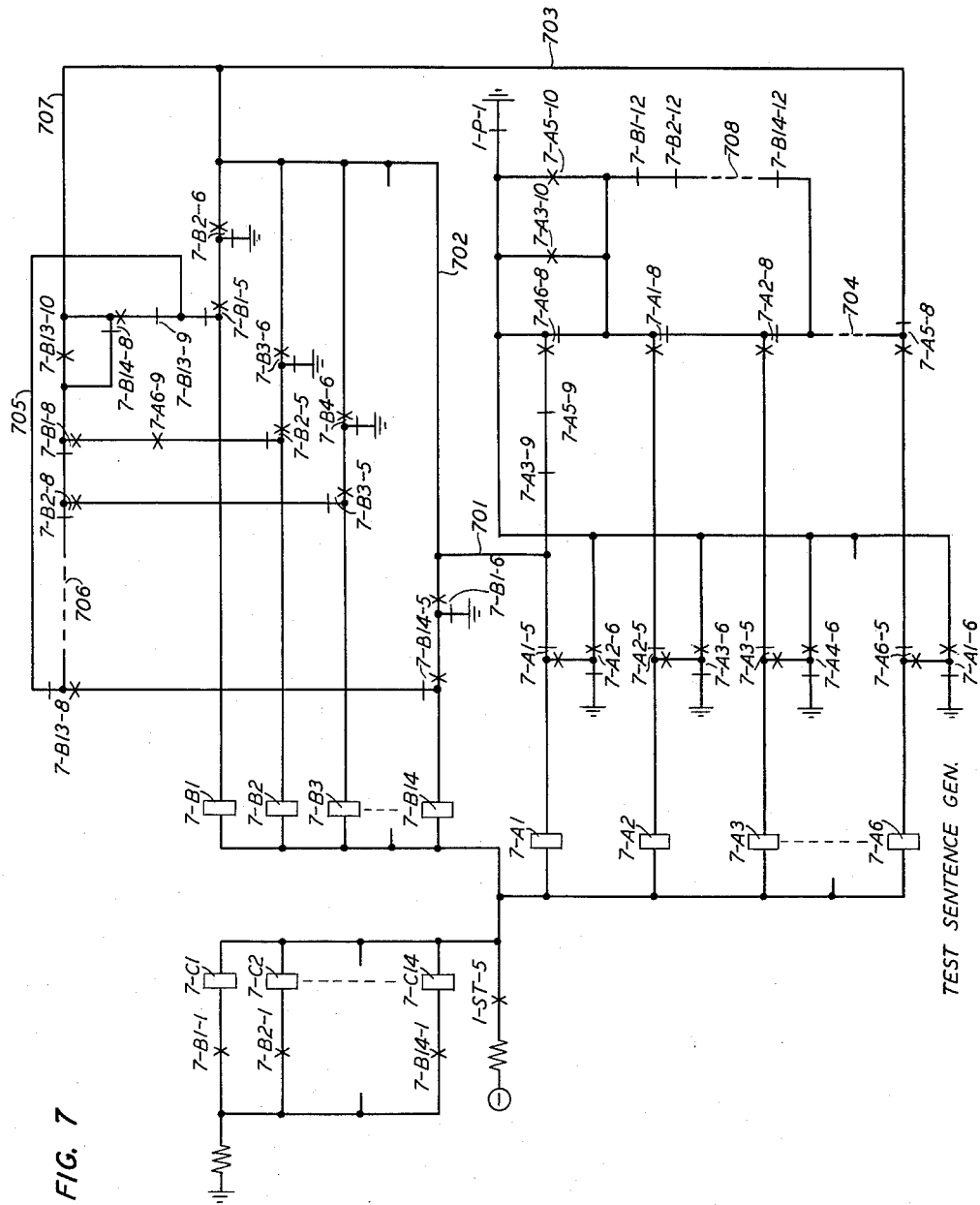

Relay 8–CNXA operated completes a path from ground to the winding of relay 10–EDC by way of make contacts 8–CNXA–10 and break contacts 11–C3A–9. The resultant operation of relay 10–EDC completes an obviously operated path for relay 10–CCR by way of make contacts 10–EDC–9. Relay 10–CCR operated completes an operating path for relay 2–SCX by way of break contacts 10–TS–4, make contacts 10–EDC–8, the break contacts of contacts 2–PR–1, make contacts 10–CCR–2 and position 1 of arc 2 of selector SCS. In addition, relay 10–CCR operated extends ground by way of make contacts 10–CCR–12, FIG. 1, to the winding of relay 1–ST. Relay 1–ST operated initiates the operation of the test sentence generator shown in FIGS. 1 and 7. The functions of test sentence generator together with the distortion set 101 is described hereinafter.

Returning now to relay 2–SCX operated, a path is completed from the winding of relay 8–CA through break contacts 12–DISA–1, make contacts 2–SCX–1, break contacts 11–C3A–12, break contacts 12–FLPA–1 and make contacts 8–CNXA–8 to ground operating relay 8–CA which locks by way of make contacts 8–CA–2 shunting the contacts of relays 2–SCX and 11–C3A. In addition, relay 2–SCX operated completes an obvious operating path for relay 10–TUX by way of make contacts 2–SCX–5 operating relay 10–TUX which locks by way of make contacts 10–TUX–8, make contacts 10–CCR–1 and off-normal contacts 1005 of selector TU. Relay 8–CA operated completes a supplementary holding path for relay 10–CCR via make contacts 8–CA–10.

Relay 10–TUX operated completes an obvious operating path for relay 10–TS by way of make contacts 10–TUX–11 and relay 10–TS locks by way of make contacts 10–TS–9, make contacts 10–CCR–3 and normally closed off-normal contacts 1024 of selector TDP. Relay 10–TS operated opens the previously described operating path for relay 2–SCX and the relay releases. In addition, relay 10–TS operated completes an obvious operating path for relay 2–PR by way of make contacts 10–TS–6 and relay 2–PR locks by way of the make contacts of contacts 2–PR–1, make contacts 10–CCR–2 and position 1 of arc 2 of selector SCS. In addition, relay 10–TS operated completes an obvious operating path for relay 10–TSX by way of make contacts 10–TS–10. Relay 10–TSX operated extends battery to clutch magnet CLM2 of distributor 4–DST2, FIG. 4, initiating the operation of the test sentence instruction generator.

Figure 4:
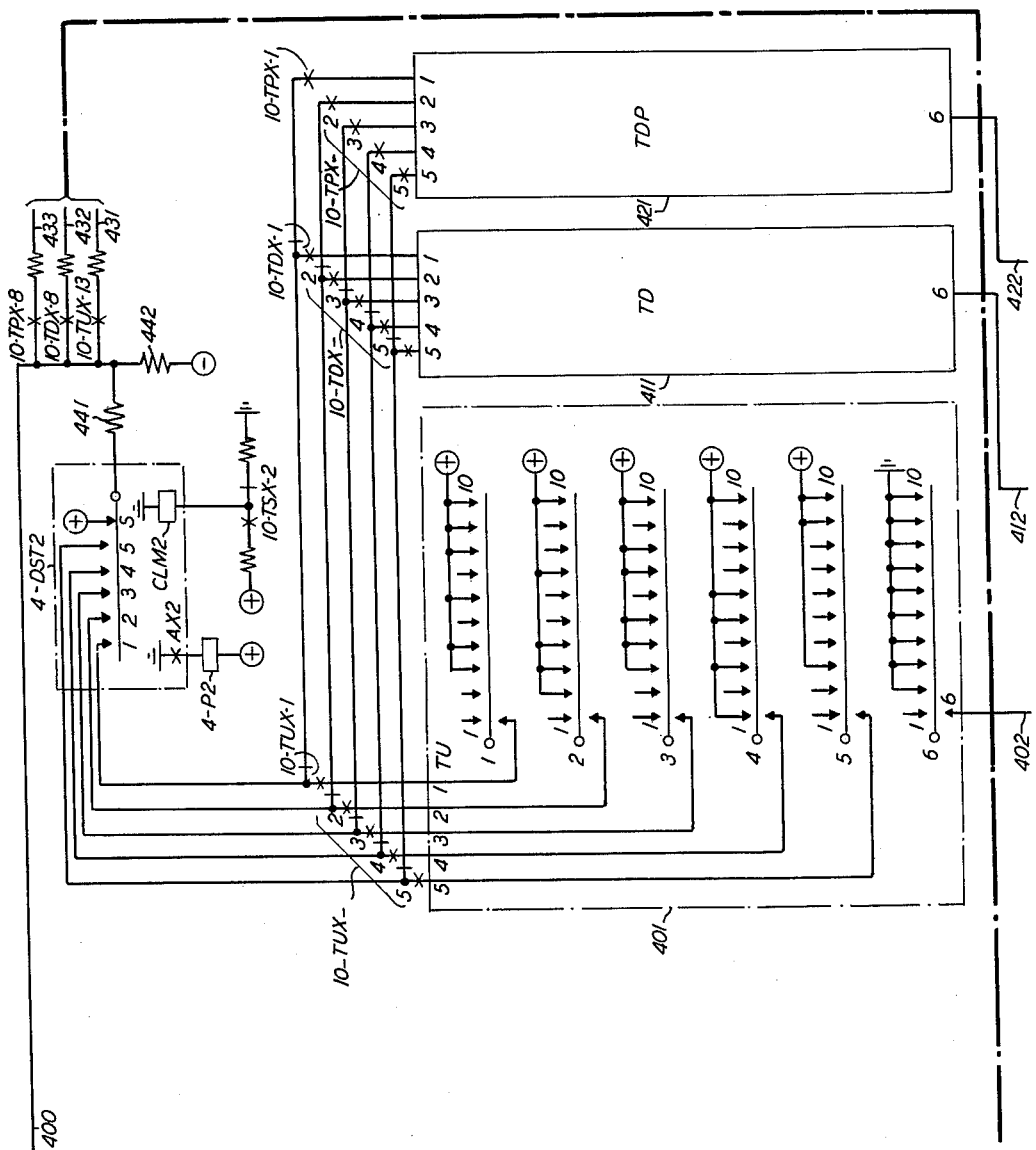
Figure 10:
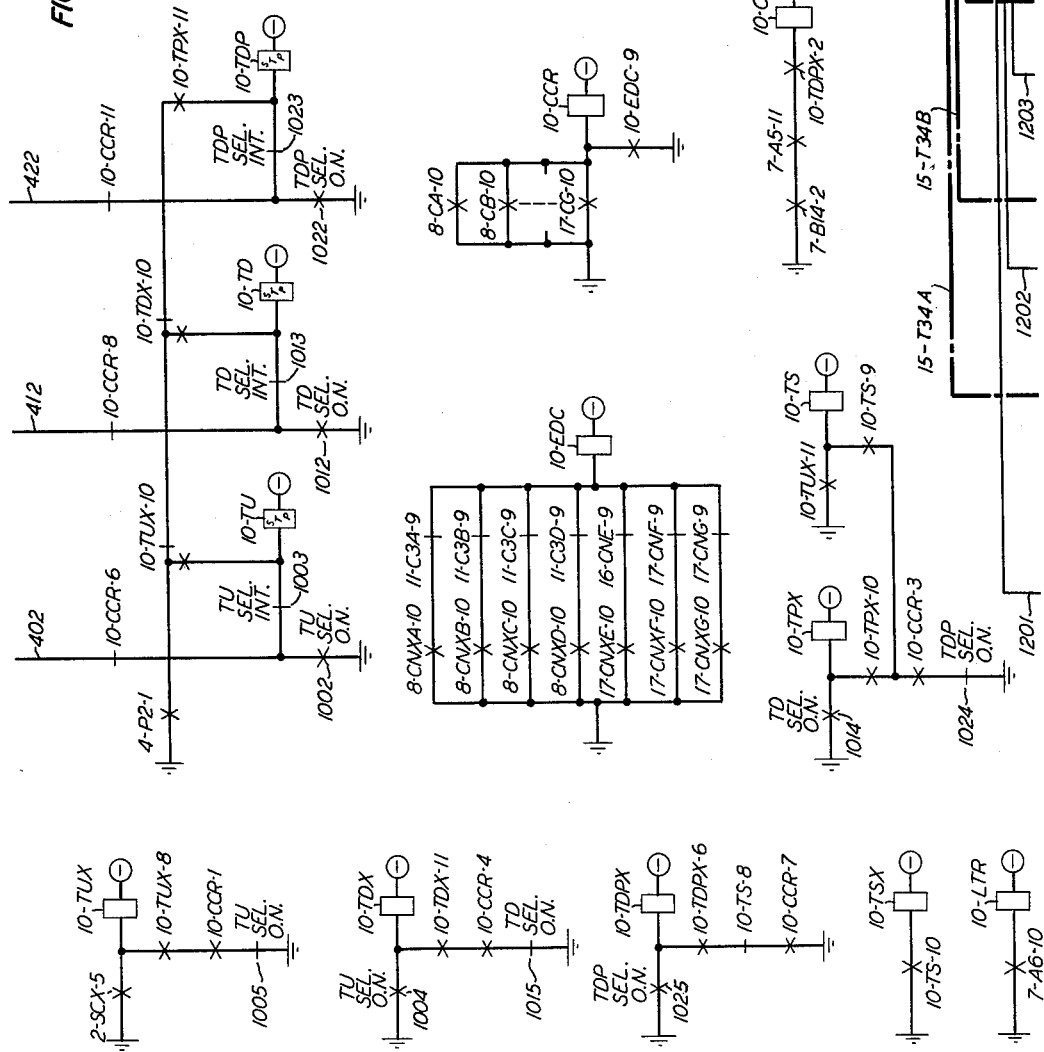

The test sentence instruction generator comprises distributor 4–DST2 together with selector TU, selector TD and selector TDP, all shown in FIGS. 4 and 10. In the initial condition, prior to the operation of relay 10–CCR, the wipers of all of the above-mentioned stepping selectors are on position 1. In the event that the wipers of selector TU are on position 2, for example, of arcs 1 through 6, which arcs are shown included in block 401, ground is applied by way of position 2 and the wiper of arc 6, lead 402, break contacts 10–CCR–6 and interrupter contacts 1003 of selector TU to the winding of step magnet 10–TU. The consequent energization of step magnet 10–TU opens interrupter contacts 1003 whereby step magnet 10–TU is de-energized and the wipers step to position 3. With the wipers on position 3, step magnet 10–TU is re-energized and the wipers thus conduct to step to the off-normal position. When the wipers step to the off-normal position, off-normal contacts 1002 of selector TU close, reapplying current to step magnet 10–TU. The consequent opening of interrupter contacts 1003 de-energizes step magnet 10–TU whereby the wipers step to position 1, as shown in FIG. 4.

With relay 10–TUX operated, the wipers of arcs 1 through 5 of selector TU extend to segments 1 through 5 of distributor 4–DST2. For example, the wiper of arc 1 extends to the first segment of distributor 4–DST2 by way of the make contacts of contacts 10–TUX–1. Accordingly, positive battery is applied to the segments of distributor 4–DST2 in accordance with the positioning of the wipers of selector TU and the strapping of the various positions. In position 1, battery is applied to segment 4 of the distributor 4–DST2 by way of position 1 and the wiper of arc 4 and make contacts 10–TUX–4. Thus distributor 4–DST2 is initially coded with the teletypewriter character Carriage-Return.

The output of distributor 4–DST2 extends to lead 400 by way of resistor 441. In the normal idle marking condition positive battery is applied by way of the stop segment through resistor 441 precluding the application of negative battery by way of resistor 442 to output lead 400. With relays 10–TUX, 10–TS, and 8–CA operated, lead 400 extends to the grid of tube TTRA, FIG. 2, by way of make contacts 10–TUX–9, break contacts 8–CNA–2, the make contacts of contacts 10–TS–2, the break contacts of contacts 11–C3A–8, the break contacts of contacts 8–B1A–8 and the make contacts of contacts 8–CA–1.

Prior to the connection of the output of distributor 4–DST2 to the grid of tube TTRA, ground is extended to the grid by way of resistor 211 maintaining the tube conductive whereby plate current is drawn by way of the winding of polar relay 2–STA. This maintains contacts 2–STA–1 closed whereby, as previously described, a marking condition is applied to transistor Q4A in test line subset A. Upon the connection of distributor 4–DST2 to the grid of tube TTRA, the positive battery applied by way of the stop segment and resistor 411 precludes the application of negative battery to lead 400, as previously described, whereby tube TTRA is maintained conductive and polar relay 2–STA remains in the marking condition.

Returning now to relay 2–TSX operated, the previously described energization of clutch magnet CLM2 starts the rotation of distributor 4–DST2 whereby positive battery is removed from the common segment of the distributor, and lead 400 is rendered negative turning OFF tube TTRA. The removal of the plate current of tube TTRA through relay 2–STA opens contacts 2–STA–1 whereby telephone line subset A sends a spacing start signal to telephone line A.

During the transmission of the spacing start signal auxiliary contacts AX2 of distributor 4–DST2 close, operating relay 4–P2. Relay 4–P2 operated completes an energizing path for step magnet 10–TU by way of make contacts 4–P2–1 and the make contacts of contacts 10–TUX–10. Distributor 4–DST2 continues to rotate, precluding the application of negative battery to lead 400 during the closure of the fourth segment whereby test line subset A sends the initial character Carriage-Return to telephone line A.

After the transmission of the fifth character element, auxiliary contacts AX2 reopen releasing relay 4–P2 which, in turn, opens the previously described energizing path for step magnet 10–TU. The de-energization of step magnet 10–TU advances the wipers of selector TU to the second position. In the second position positive battery is applied to segment 2 of distributor 4–DST2 whereby the distributor is coded with the character Line-Feed.

During the second revolution of the distributor 4–DST2 the character Line-Feed is transmitted to telephone line A. In addition, relay 4–P2 operates and releases in the same manner as previously described whereby the wipers of selector TU step to position 3. Accordingly, the wipers of selector TU successively step through the ten positions of the six arcs shown in block 401 successively coding distributor 4–DST2 in accordance with the strappings of arcs 1 through 5, whereby ten characters are transmitted to telephone line A. In accordance with the present embodiment, as shown in FIG. 4, these ten characters comprise the sequence Carriage-Return Line-Feed Letters U N D I S T and Letters; thereby advising the remote subscriber that the first test sentence is undistorted.

During the tenth revolution of distributor 4–DST2, relay 4–P2 operates and releases whereby the wipers of selector TU step to the off-normal position. With the wipers on the off-normal position, off-normal contacts 1002 close, energizing step magnet 10–TU and the subsequent opening of interrupter contacts 1003 step the wipers of selector TU back to position 1. In addition, the closure of off-normal contacts 1004 completes an obvious operating path for relay 10–TDX which locks by way of make contacts 10–TDX–11, make contacts 10–CCR–4 and the normally closed off-normal contacts 1015 of selector TD. Finally, the opening of off-normal contacts 1005 opens the previously described locking path for contacts 10–TUX and the relay releases.

The release of relay 10–TUX opens the previously described paths connecting segments 1 through 15 of distributor 4–DST2 to the wipers of selector TU. With relay 10–TDX operated the five segments of distributor 4–DST2 are now connected through the break contacts of relay 10–TUX and the make contacts of relay 10–TDX to the wipers of selector TD, not shown but generally indicated by block 411. It is noted that the wipers and arcs 1 through 6 of selector TD are arranged in substantially the same manner as the wipers and arcs 1 through 6 of selector TU with the exception that the selector TD positions are strapped in accordance with a second test sentence instruction. This second test sentence instruction, in accordance with the present embodiment suitably comprises the characters Carriage-Return Line-Feed Letters D I S T Letters Letters Letters.

It is noted that selector TD is normally stepped to the first position. This is accomplished by the suitable application of ground to lead 412 when the wipers are on any other position. Before relay CCR operates, the ground on lead 412 extends by way of break contacts 10–CCR–8 and interrupter contacts 1013 of selector TD to the winding of step magnet 10–TD. Accordingly, selector TD is self-stepped in the same manner as selector TU and when in the off-normal position, self-steps to position 1 as a result of the application of ground through off-normal contact 1012.

Returning now to relay 10–TDX operated and relay 10–TUX released, the eleventh rotation of distributor 4–DST2 operates and releases relay 4–P2 in the same manner as previously described. Ground is applied through make contacts 4–P2–1, the break contacts of contacts 10–TUX–10 and the make contacts of contacts 10–TDX–10 to the winding of step magnet 10–TD. Accordingly, during the eleventh through twentieth rotation of distributor 4–DST2 the wipers of selector TD are selectively stepped from position 1 through position 10 and distributor 4–DST2 is successively coded with the above-mentioned second test sentence instruction.

When relay 10–TUX releases, the previously described path extending lead 400 to the grid of tube TTRA is opened whereby the ground applied by way of resistor 211 maintains the tube conductive and, in turn, relay 2–STA in the marking condition. The operation of relay 10–TDX extends lead 400 through make contacts 10–TDX–9, FIG. 2, to make contacts 11–C1A–2. Accordingly, the second test sentence instruction is not transmitted by test line subset A to telephone line A. It is noted, however, that lead 400 also extends to input terminal 1 of each of subset B input gate, generally indicated by block 202, subset C input gate, generally indicated by block 203, and subset D input gate, generally indicated by block 204. These signals may be transmitted to other telephone lines in the event that a plurality of subsets are simultaneously being tested, as described hereinafter.

At the conclusion of the twentieth revolution of distributor 4–DST2, selector TD steps to the off-normal position closing off-normal contacts 1012 whereby the selector is again stepped to position 1. With the selector wipers in the off-normal position, off-normal contacts 1015 open the previously described locking path for the relay 10–TDX and the relay releases. In addition, off-normal contacts 1014 close completing an obvious operating path for relay 10–TPX which locks by way of make contacts 10–TPX–10, make contacts 10–CCR–3 and the normally closed off-normal contacts 1024 of selector TDP.

The operation of relay 10–TPX and the release of relay 10–TDX transfers the segments of distributor 4–DST2 from the wipers of selector TD to the wipers of selector TDP, not shown, but generally indicated by block 421. The wipers and arcs 1 through 6 of selector TDP are arranged in substantially the same manner as the wipers of selector TU with the exception that arcs 1 through 5 are strapped to code distributor 4–DST2 with the third test sentence instruction comprising the characters Carriage-Return Line-Feed D I S Space P A D Letters. Output lead 400 now extends by way of make contacts 10–TPX–9 to the contacts of relay 11–C2A. Since the contacts of relay 11–C2A are open, tube TTRA is maintained conductive, and the third test line instruction is not sent to telephone line A.

During the twenty-first revolution of distributor 4–DST2, relay 4–P2 operates and releases as previously described. This extends the ground through make contacts 4–P2–1, the break contacts of contacts 10–TUX–10, the break contacts 10–TDX–10 and make contacts 10–TPX–11 to step magnet 10–TDP. Accordingly, selector TDP is successively stepped through positions 1 through 10, and the third test sentence instruction is applied to lead 400 during the twenty-first through the thirtieth revolution of distributor 4–DST2.

Near the end of the thirtieth revolution of distributor 4–DST2 step magnet 10–TDP is de-energized, whereby selector TDP steps to the off-normal position. This closes off-normal contacts 1022 to re-energize step magnet TDP stepping the selector back to position 1. With selector TDP in the off-normal position, off-normal contacts 1024 open the previously described locking paths for relays 10–TPX and 10–TS and these relays release. The release of relay 10–TS releases relay 10–TSX and relay 10–TSX released opens the previously described energized path for clutch magnet CLM2 whereby distributor 4–DST2 stops after thirty revolutions. In addition, off-normal contacts 1025 close completing an obvious operating path for relay 10–TDPX which locks by way of make contacts 10–TDPX–6, break contacts 10–TS–8 and make contacts 10–CCR–7. Relay 10–TDPX operated partially completes an operating path for relay 10–OKT by way of make contacts TDPX–2. Relay 10–OKT, however, does not operate until the first cycle of the test line sentence generator is completed. Accordingly, the control circuit associated with test line subset A awaits the completion of the cycle of the test sentence generator.

*Test Sentence Generator*

As previously described, relay 10–CCR operates prior to the transmission of the test sentence instruction whereby relay 1–ST is operated in turn. Relay 1–ST operated completes an obvious energizing path for clutch magnet CLM1 of distributor 1–DST1 releasing the distributor for rotation. Distributor 1–DST1 is part of the test sentence generator shown in FIGS. 1 and 7.

In addition, relay 1–ST operated extends negative battery to the windings of relay 7–A1 through relay 7–A6 and relay 7–B1 through relay 7–B14. Since ground is extended to the winding of relay 7–A1 by way of break contacts 1–P1–1, the break contacts of contacts 7–AC–8, contacts 7–A1–8 and contacts 7–A2–8, the break contacts of relays 7–A3 and 7–A4, not shown, but generally indicated by dash line 704, the break contacts of contacts 7–A5–8, leads 703, 702 and 701 and the break contacts of contacts 7–A1–5, relay 7–A1 operates and locks to ground by way of the make contacts of contacts 7–A1–5 and the break contacts of contacts 7–A2–6. In addition, the ground on lead 703 extends through lead 707, the break contacts of contacts 7–B14–8, contacts 7–B1–8 and contacts 7–B2–8, the break contacts of relays 7–B3 through 7–B12, not shown, but generally indicated by dash line 706, the break contacts of contacts 7–B13–8, lead 705 and the break contacts of contacts 7–B1–5 to the winding of relay 7–B1 whereby the relay operates and locks to ground by way of the make contacts of contacts 7–B1–5, and the break contacts of contacts 7–B2–6. Relay 7–A1 operated extends ground to the winding of relay 7–A2 by way of break contacts 1–P–1, the break contacts of contacts 7–A6–8, the make contacts of contacts 7–A1–8 and the break contacts of contacts 7–A2–5 whereby relay 7–A2 operates and locks to ground via the make contacts of contacts 7–A2–5 and the break contacts of contacts 7–A3–6. Relay 7–A2 operated transfers the locking path of relay 7–A1 through the make contacts of contacts 7–A2–6 and break contacts 1–P–1 to ground.

At the start of the first revolution of the distributor 1–DST1 auxiliary contacts AX1 close operating relay 1–P. The operation of relay 1–P opens the previously described locking path for relay 7–A1 and the relay releases.

After the transmission of the fifth element by distributor 1–DST1, auxiliary contacts AX1 reopen releasing relay 1–P. The release of relay 1–P extends ground through break contacts 1–P–1, the break contacts of contacts 7–A6–8 and contacts 7–A1–8, the make contacts of contacts 7–A2–8 and the break contacts of contacts 7–A3–5 to the winding of relay 7–A3 operating the relay which locks to ground by way of the make contacts of contacts 7–A3–5 and the break contacts of contacts 7–A4–6. Relay 7–A3 operated transfers the locking path of relay 7–A2 through the make contacts of contacts 7–A3–6 and break contacts 1–P–1 to ground.

At the beginning of the second revolution of distributor 1–DST1, auxiliary contacts AX1 reclose operating relay 1–P. Relay 1–P operated opens the previously described locking path for relay 7–A2 whereby the relay releases.

In the second through fourth revolutions of distributor 1–DST1 relay 1–P operates and releases whereby relays 7–A4 through 7–A6 successively operate in substantially the same manner as the previous relays in the counting chain. In addition, the operation of relay 7–A6 completes a path from the winding of relay 7–B2 through the break contacts of contacts 7–B2–5, make contacts 7–A6–9, the make contacts of contacts 7–B1–8 and the break contacts of contacts 7–B14–8 to lead 707. Since relays 7–A5 and 7–A6 are operated, ground is not applied to lead 707 however by way of the break contacts of contacts 7–A5–8 nor by way of break contacts 7–A5–9.

At the beginning of the fifth revolution of distributor 1–DST1, relay 1–P operates opening the locking path for relay 7–A5. Near the end of the fifth revolution of distributor 1–DST1, relay 1–P releases whereby the previously described ground is applied to lead 707 and relay 7–B2 operates and locks by way of the make contacts of contacts 7–B2–5 and the break contacts of contacts 7–B3–6. Relay 7–B2 operated transfers the locking path of relay 7–B1 through the make contacts of contacts 7–B2–6 to the ground on lead 707. In addition, the ground extended to lead 701 by way of the make contacts of contacts 7–A6–8 is extended to the winding of relay 7–A1 which operates and locks as previously described.

When the sixth revolution of the distributor 1–DST1 is started, relay 1–P operates and opens the previously described locking paths for relay 7–A6 and 7–B1 whereby these relays release. The release of relay 7–B1 extends the winding of relay 7–B3 through the break contacts of contacts 7–B3–5, the make contacts of contacts 7–B2–8 and the break contacts of contacts 7–B1–8 and contacts 7–B14–8 to lead 707. Ground cannot be applied to lead 707, however, since relay 7–A6 is released and relay 7–A1 is operated.

During the next five revolutions of distributor 1–DST1, relays 7–A2 through 7–A6 successively operate as previously described. At the conclusion of the eleventh revolution with relay 7–A6 operated, the release of relay 1–P reapplies ground to lead 701 whereby relay 7–B3 operates and relay 7–A1 reoperates. Accordingly, relays 7–A1 through 7–A6 successively operate during each successive six revolutions of distributor 1–DST1 and relays 7–B1 through 7–B14 successively operate at the conclusion of each of the six revolutions.

At the conclusion of the eighty-third revolution of the distributor 1–DST1, relay 7–A6 operated completes an operating path for relay 7–B1 by way of the break contacts of contacts 7–B1–5, break contacts 7–B13–9 and the make contacts of contacts 7–B14–8 to lead 707. The subsequent operation of relay 1–P at the start of the eighty-fourth revolution releases relays 7–A6 and 7–B14 whereby only relays 7–A1 and 7–B1 remain operated. With relays 7–A1 and 7–B1 operated, the successive stepping of the relay chains recommences. It is noted, however, since only relays 7–A1 and 7–B1 are operated, the second sequence requires eighty-four rotations of distributor 1–DST1 to recycle the two chains. Accordingly, eighty-four different permutations of relay operations are provided.

Relay 7–B1 operated completes an obvious operating path for relay 7–C1. Similarly, 7–B2 through 7–B14 complete obvious operating paths for relays 7–C2 through 7–C14, respectively. With relays 7–A1 and 7–C1 operated, segments 1 through 4 and 5 of distributor 1–DST1 are extended through make contacts 7–A1–1 through 7–A1–4 and 7–A1–7 and the make contacts of contacts 7–C1 to positive battery. Accordingly, during the first revolution of distributor 1–DST1 during the second counting sequence, the distributor is coded with the character Letters. During the second revolution of distributor 1–DST1, battery is extended by way of make contacts of relay 7–C1 and make contacts 7–A2–1 to the fourth segment whereby the distributor is coded with the character Carriage-Return. In a similar manner, the distributor is coded with various characters during each of the successive revolutions whereby an appropriate test sentence of eighty-four characters is formed. This test sentence may appropriately comprise the well-known "Fox" sentence together with the other appropriate characters. During the final or eighty-fourth revolution of distributor 1–DST1, the five segments are extended to battery by way of make contacts of relay 7–A6 and relay 7–C14 coding the distributor with the character Letters.

In the idle marking condition, positive battery is applied by way of the stop segment of distributor 1–DST1 to the junction of resistors 121 and 122 thereby precluding the application of negative battery to lead 101. During the transmission of a spacing signal such as the spacing start signal distributor 1–DST1 does not provide positive battery whereby negative battery is applied to lead 101 by way of resistor 122. Accordingly, negative spacing signals and positive going marking signals are applied to lead 101 in accordance with the teletypewriter characters transmitted by distributor 1–DST1.

The negative spacing signals and the positive going marking signals applied to lead 101 are also extended to the grid of tube 102. The application of the negative spacing signal to the grid of tube 102 turns the tube OFF whereby postively battery is applied by way of resistor 123 to overcome the negative battery applied by way of resistor 123 to the grid of tube 103. Accordingly, spacing signals turn ON tube 103. Conversely, the positive going marking signals turn ON tube 102 removing the positive battery applied to the grid of tube 103 whereby the latter tube turns OFF. Since the plate of tube 103 is connected to input terminal 1 of telegraph signal distortion set 104, negative current spacing signals and no current marking signals are applied to the input of distortion set 104 in accordance with the telegraph signals transmitted by distributor 1–DST1.

Distortion set 104 is an arrangement, well known in the art, which accepts telegraph signals and provides at the output thereof selected distortion of the incoming telegraph signals. A suitable arrangement of this type is disclosed for example, in Patent 2,813,151 granted to B. Ostendorf, Jr., et al. on November 12, 1957. The disclosure of the Ostendorf et al. patent is hereby incorporated herein as though fully set forth herein. As disclosed in the patent of B. Ostendorf et al., input signals may be provided to the left-hand grid of tube VI, FIG. 1, and distorted output signals are provided at the plate of tube V6, FIG. 2. These signals comprise negative space signals and positive going marking signals. Accordingly, the output of distributor 1–DST1 is applied to lead 105 through distortion set 104 in the form of distorted negative spacing and positive going marking signals.

Recalling now that relays 7–A6 and 7–B14 were simultaneously operated during the eighty-third counting of the first sequence, the energizing path for step magnet 2–SCS is completed by way of make contacts 7–B14–9, make contacts 7–A6–11 and break contacts 10–TS–7. Since relay 10–TS releases after the transmission of the three ten-character test sentence instructions, it is obvious that relay 10–TS is released before the eighty-third revolution of distributor 1–DST1. Accordingly, the previously described energized path for step magnet 2–SCS is completed when relays 7–A6 and 7–B14 are simultaneously operated.

Figure 2:
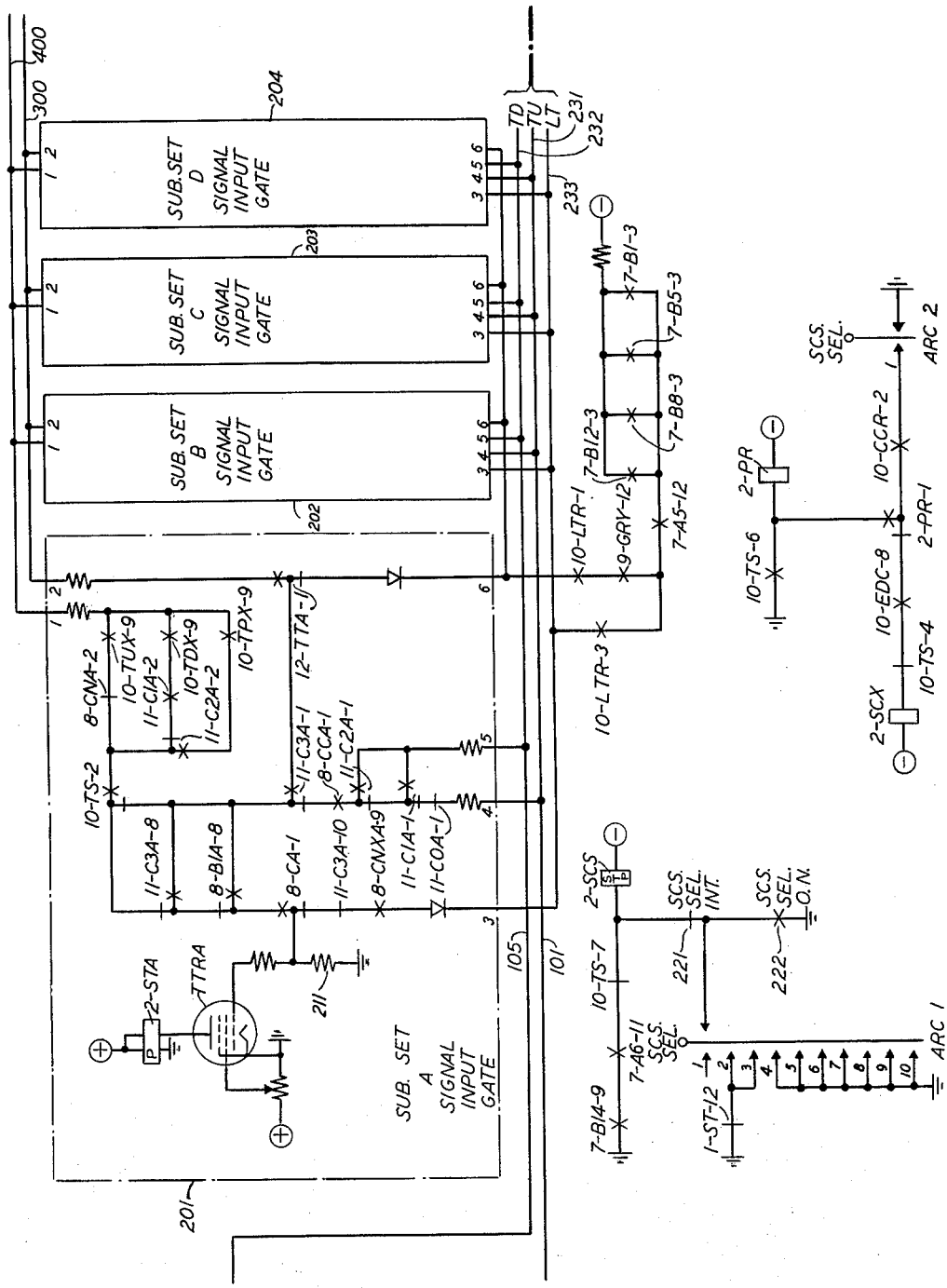
Figure 3:
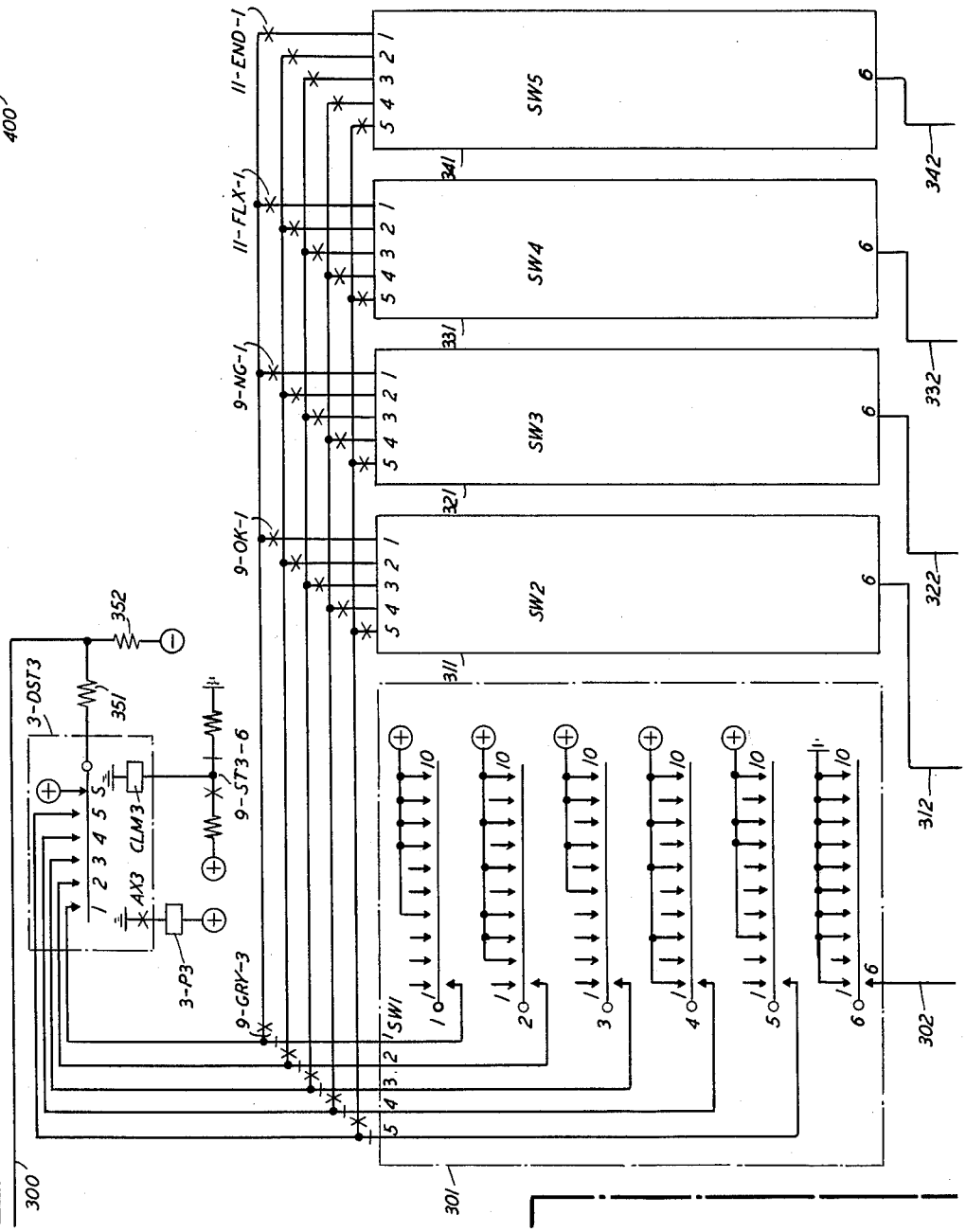

Stepping selector SCS is provided with two arcs as shown in FIG. 2. It is noted that in the event that the selector wiper of arc 1 is on one of positions 4 through 10, ground is applied by way of the particular position and the wiper of arc 1 and interrupter contacts 221 to step magnet 2–SCS. Accordingly, selector SCS self-steps to the off-normal position where the ground extended by way of off-normal contacts 222 again steps selector SCS to position 1. Similarly, in the initial idle condition with relay 1–ST released, if the wipers of selector SCS are on positions 2 or 3, ground is extended by way of break contacts 1–ST–12 to step the wipers to position 4 where the wipers are again stepped to position 1, as previously described.

Returning now to the energization of step magnet 2–SCS by the operation of relays 7–A6 and 7–B14, the subsequent release of these relays prior to the second counting sequence de-energizes step magnet 2–SCS whereby the wipers step to position 2. Since relay 1–ST is now operated, the wipers remain on position 2 for the second counting sequence. At the termination of the second counting sequence, relays 7–A6 and 7–B14 are again simultaneously operated and the subsequent release of these relays prior to the third counting sequence steps the wipers of selector SCS to position 3. Similarly, at the conclusion of the third counting sequence, the wipers of selector SCS step to position 4 whereupon the selector is self-stepped to position 1, as previously described.

Returning now to the first counting sequence of the test sentence generator, when relays 7–A5 and 7–14B operate simultaneously, the operating path for relay 10–OKT is completed by way of make contacts 7–B14–2, make contacts 7–A5–11 and make contacts 10–TDPX–2 since relay 10–TDPX was previously operated. At the conclusion of the transmission of the three test sentence instructions, the operation of relay 10–OKT completes an operating path for relay 8–CCA in the subset A phase control circuit. This path may be traced from ground through make contacts 10–OKT–1 and break contacts 10–TS–3 whereby relay 8–CCA operates and locks through ground. Relay 10–OKT operated also completes the operating path of relay 8–CNA by way of the break contacts of contacts 12–FLPA–7, make contacts 8–CA–3 and make contacts 10–OKT–7 and relay 8–CNA locks to ground via make contacts 8–CNXA–8.

Relay 8–CCA operated extends output lead 101 of the test sentence generator through break contact 11–C0A–1 in the subset A signal input gate, the break contacts of contacts 11–C1A–1, the break contacts of contacts 11–C2A–1, make contacts 8–CCA–1, the break contacts of contacts 11–C3A–1, the break contacts of contacts 10–TS–2, the break contacts of contacts 11–C3A–8, the break contacts of contacts 8–B1A–8 and the make contacts of contacts 8–CA–1 to the grid electrode of tube TTRA. Accordingly, the subsequent output signals applied by the test sentence generator to lead 101 is repeated by subset A to telephone line A. In addition, during the next revolution of distributor 1–DST1, relays 7–B14 and 7–A6 simultaneously operate whereby the wipers of selector SCS step to position 2, as previously described. This opens the previously described locking path for relay 2–PR and the relay releases.

At the conclusion of the sequence which constitutes the first test sentence transmitted to line A, relays 7–B14 and 7–A6 are again operated simultaneously whereby the wipers of the selector SCS are stepped to position 3 as previously described. At the conclusion of the transmission of the second test sentence to telephone line A, step magnet 2–SCS is again energized whereby the wipers of selector SCS step to position 4 and then self-step back to position, as previously described. With the wipers on position 1 and relay 2–PR released, the previously described operating path of relay 8–SCX is recompleted and relay 2–SCX operated reoperates relays 10–TUX and 10–TS, in turn, in the same manner as previously described. Relay 10-TS operated releases relay 2-SCX and operates relay 2-PR in the same manner as previously described. Relay 10-TS operated opens the previously described locking path for relay 10-TDPX and the latter relay releases. Relay 10-TS operated also opens the previously described locking path for relay 8-CCA and this relay releases. In addition, relay 10-TS operated recompletes the operated path for relay 10-TSX.

Figure 11:
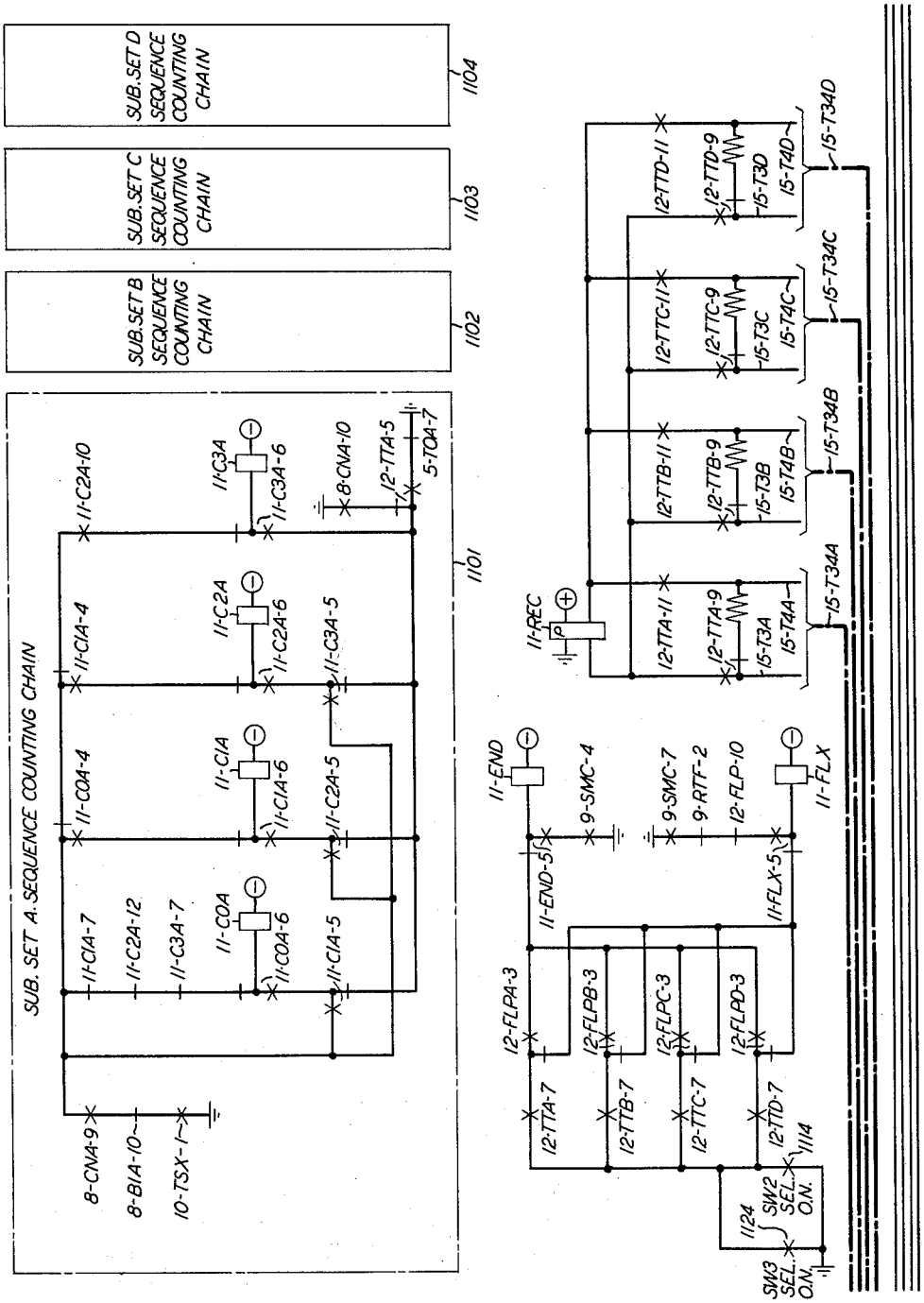
Figure 12:
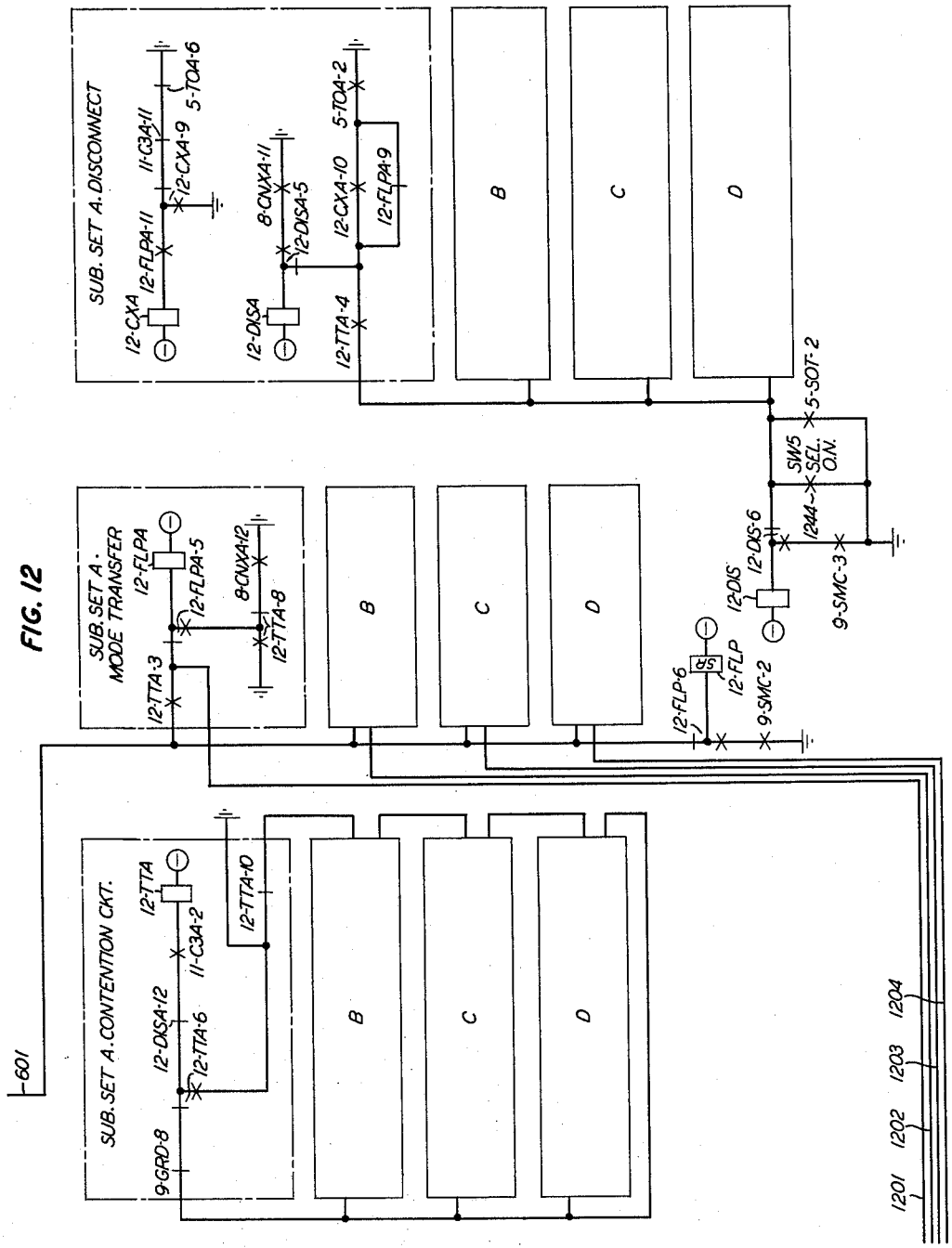

Relay 10-TSX operated initiates the operation of the subset A sequence counting chain, FIG. 11, by completing a path from ground through make contacts 10-TSX-1, break contacts 8-B1A-10, make contacts 8-CNA-9, break contacts 11-C1A-7, break contacts 11-C2A-12, break contacts 11-C3A-7 and the break contacts of contacts 11-COA-6. This results in the operation of relay 10-COA which locks by way of the make contacts of contacts 11-COA-6, the break contacts of contacts 11-C1A-5, break contacts of contacts 12-TTA-5 and make contacts 8-CNA-10. Relay 10-TS operated also opens the previously described path connecting output lead 101 of the test sentence chain to the grid of tube TTRA by way of the break contacts of contacts 10-TS-2.

With relay 11-COA operated the ground through make contacts 8-CNA-9 is extended through the make contacts of contacts 11-COA-4 and break contacts of contacts 11-C1A-6 to the winding of relay 11-C1A operating the relay which locks by way of the make contacts of contacts 11-C1A-6, the break contacts of contacts 11-C2A-5 and the contacts of relays 12-TTA and 8-CNA. Relay 11-C1A operated transfers the locking path of relay 11-COA through the make contacts of contacts 11-C1A-5 to the ground applied through make contacts 8-CNA-9. With relays 10-TS, 10-TUX and 10-TSX operated, the sentence instruction generator is again prepared to transmit the three test sentence instructions.

Extending the Test Sentence Transmission

Assuming now that the subscriber desires more than two lines of the test sentence and transmits a break contact signal during the transmission of either of the test sentences, it is arranged that the test sentences may be transmitted to the subscriber for a period up to three minutes. If, during the transmission of the test sentences, a break signal is received over the telephone line A, transistor Q9A in timer 1411 is turned OFF whereby its negative emitter potential normally applied to the base of transistor Q14A by way of diode CR5A is removed. With the negative potential removed, capacitor CP9A starts to charge toward positive battery and assuming that the signal does not comprise a normal spacing signal, capacitor CP9A charges for a sufficient duration of time to turn ON transistor Q14A.

Figure 8:
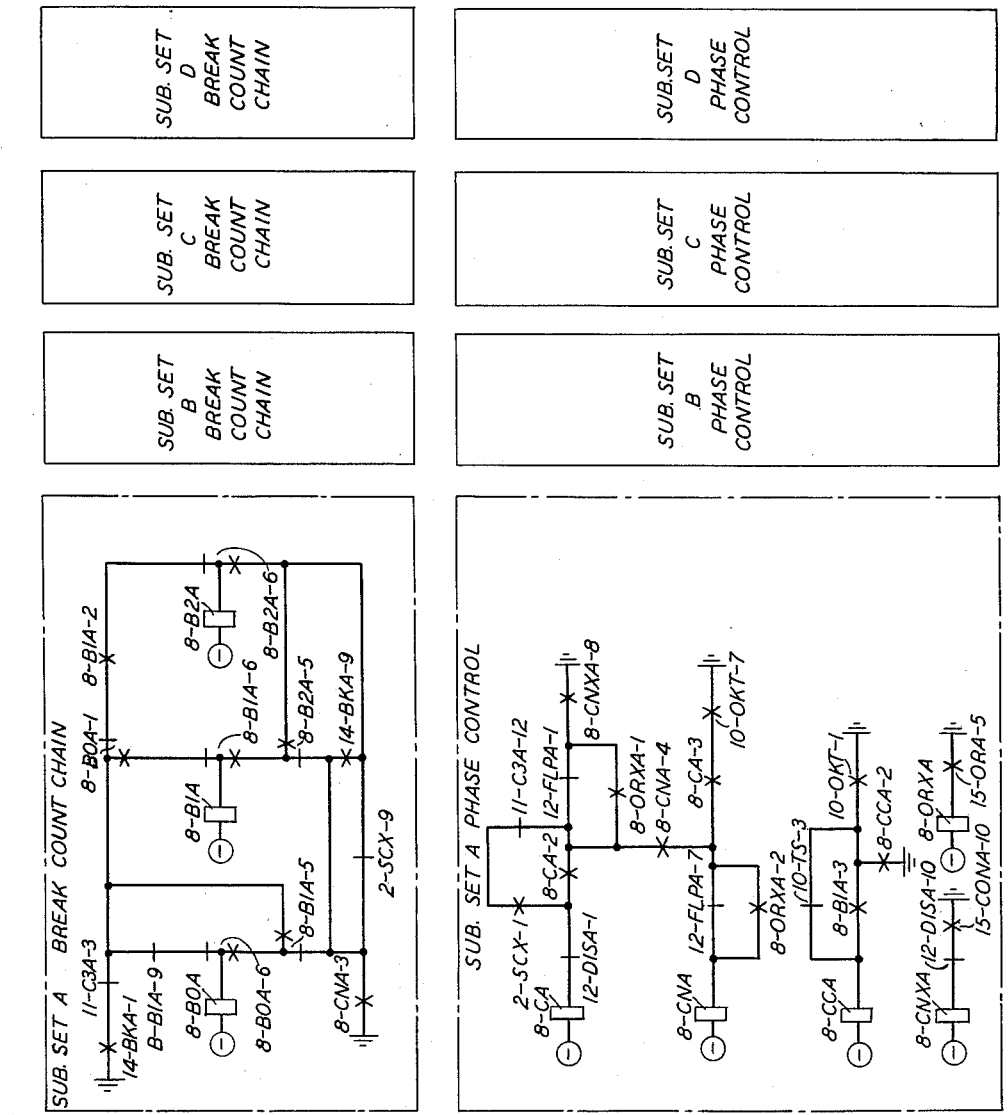
Figure 9:
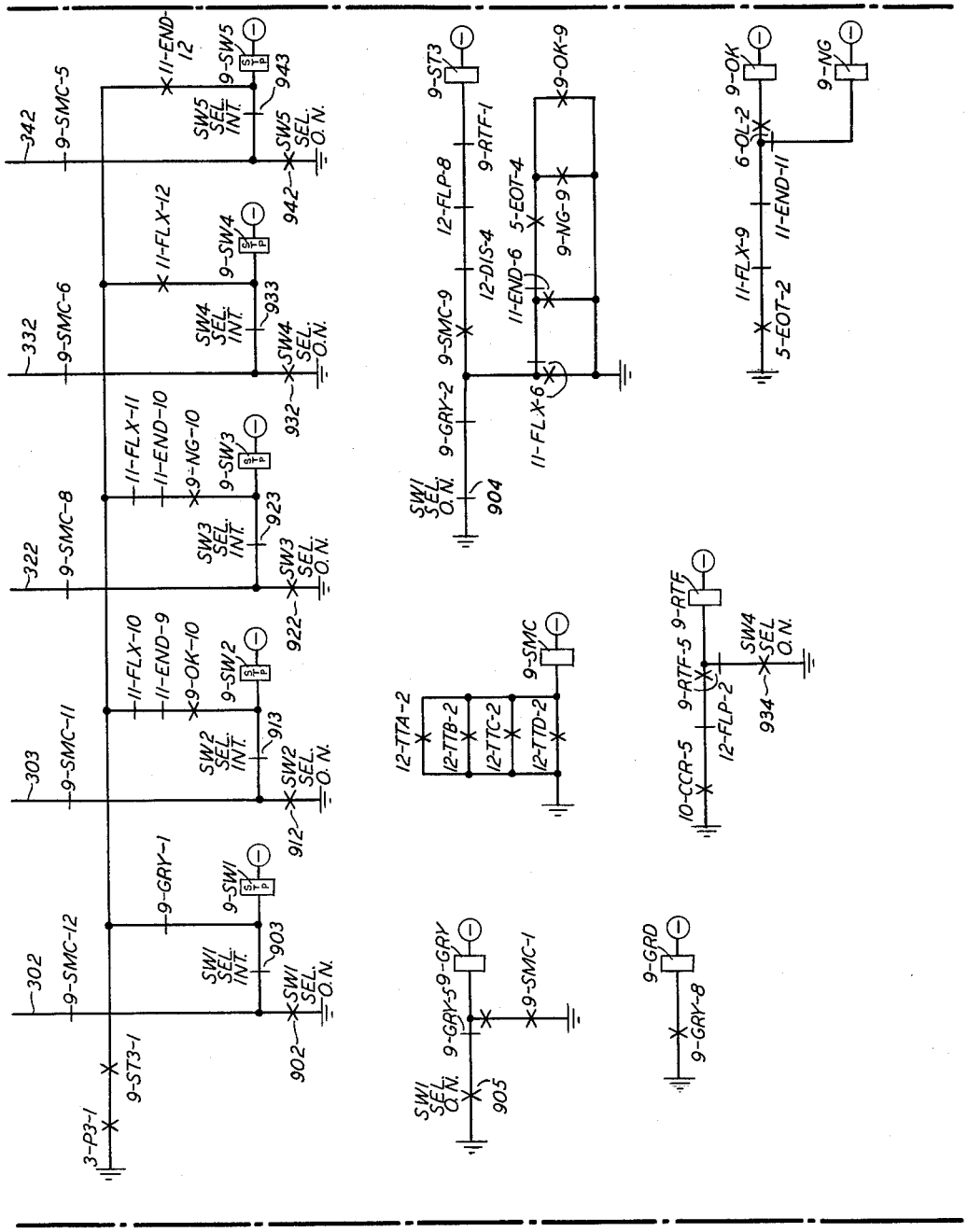

When transistor Q14A is rendered conductive, the consequent negative going collector voltage is applied to the base of transistor Q15A whereby collector current is applied through the winding of relay 14-BKA and make contacts 8-CNA-7 to ground operating relay 14-BKA which locks by way of the break contacts of contacts 8-B1A-7 and make contacts 14-BKA-3. Relay 14-BKA operated activates the subset A break count chain, FIG. 8, by extending ground through make contact 14-BKA-1, break contact 11-C3A-3, break contact 8-B1A-9 and the break contacts of contacts 8-BOA-6 to the winding of relay 8-BOA. Relay 8-BOA operated locks through the break contacts of contacts 8-BOA-6, the break contacts of contacts 8-B1A-5 and make contacts 8-CNA-3. With relay 8-BOA operated the ground applied through break contacts 11-C3A-3 is extended by way of the make contacts of contacts 8-BOA-1 and the break contacts of contacts 8-B1A-6 to the winding of relay 8-B1A. Relay 8-B1A locks by way of the make contacts of contacts 8-B1A-6, the break contacts of contacts 8-B2A-5 and make contacts 8-CNA-3. Relay 8-B1A operated transfers the locking path of relay 8-BOA through the make contacts of contacts 8-B1A-5 to the ground applied through break contacts 11-C3A-3. With relay 8-B1A operated, the locking path for relay 14-BKA is transferred through the make contacts of contacts 8-B1A-7, the break contacts of contacts 8-BOA-2 and break contacts 8-B2A-2. Since relay 8-BOA is also operated, the locking path of relay 14-BKA is open and relay 14-BKA releases at the termination of the break signal.

Relay 8-B1A when operated arranges to continue the application of the output of the test sentence generator to subset A. Lead 101 is extended through the make contacts of contacts 8-B1A-8 which shunt the break contacts of contacts 10-TS-2 in the previously described path extending to the grid of tube TTRA. Relay 8-B1A operated also supplies a supplementary locking path for relay 8-CCA by way of make contacts 8-B1A-3. In addition, relay 8-B1A operated opens break contacts 8-B1A-10 in the pulsing ground path for the subset A sequence counting chain whereby the operation of the counting chain is precluded. Relay 8-B1A operated removes negative battery applied to the grid of timing tube TTOA in the subset A extended transmission timer, FIG. 5, through break contacts 12-TTA-12, break contacts 8-B1A-4 and the break contacts of contacts 12-FLPA-6. With the negative battery removed, capacitor CP50A proceeds to charge through resistor R-50A. The release of relay 14-BKA opens the pulsing ground for the break counting chain through make contacts 14-BKA-1 whereby relay 8-BOA releases.

The test sentence generator now proceeds to send successive test sentences to telephone line A. This operation continues until the subscriber sends a second break signal or a three-minute interval expires.

Assuming a second break signal is sent by the subscriber, relay 14-BKA is reoperated in the same manner as previously described. Relay 14-BKA now locks through break contacts 8-B2A-2, break contact 8-BOA-2, the make contacts of contacts 8-B1A-7 and make contacts 8-BKA-3. Relay 14-BKA operated re-extends the break counting chain ground through break contacts 11-C3A-3, the break contacts of contacts 8-BOA-1, make contacts 8-B1A-2 and the break contacts of contacts 8-B2A-6 to the winding of relay 8-B2A. Relay 8-B2A locks by way of the make contacts of contacts 8-B2A-6, make contacts 14-BKA-9 or break contacts 2-SCX-9 in shunt thereto and make contacts 8-CNA-3. Relay 8-B2A operated opens the previously described locking path for relay 14-BKA and the latter relay releases at the termination of the break signal. In addition, relay 8-B2A operated transfers the locking path for relay 8-B1A through the make contacts of contacts 8-B2A-5 to the previously described locking path for relay 8-B2A.

When relay 2-SCX reoperates after the end of the final test sentence, as previously described, the locking paths for relays 8-B1A and 8-B2A are opened, releasing the two relays. Relay 8-B1A released recloses the previously described pulsing ground for the sequence counting chain, reapplies the negative battery to the grid of timer tube TTOA, removes the supplementary holding path for relay 8-CCA and opens the previously described path connecting lead 101 to the grid of the tube TTRA.

With relay 2-SCX operated, relays 10-TUX and 10-TS operate, in turn, as previously described. The operation of relay 10-TS releases relays 10-TDPX and 2-SCX and reoperates relays 2-PR and 10-TSX. Relay 10-TSX operated operates relay 11-COA and relay 11-C1A, in turn, in the same manner as previously described. Accordingly, this circuit is now in the same condition as if the two test sentences were transmitted without the intervening break signal.

In the event that the subscriber does not send a break signal within three minutes, capacitor CP50A continues to charge until tube TT0A is turned ON drawing plate current by way of the winding of relay 5-T0A. Relay 5-T0A operated completes an operating path for relay 12-DISA, in the subset A disconnect circuit, through the break contacts of contacts 12–DISA–5, break contacts 12–FLPA–9 and make contacts 5–TOA–2. Relay 12–DISA locks by way of the make contacts of contacts 12–DISA–5 and make contacts 8–CNXA–11. Relay 12–DISA operated completes the operating path for relay 15–SA, in subset A, through make contacts 12–DISA–2 and the make contacts of contacts 15–ANA–7. Relay 15–SA operated initiates the disconnect sequence, as described hereinafter, whereby the subset relays are released and telephone line A is restored to the on-hook condition.

Returning now to relay 12–DISA operated, the previously described operating paths for relay 8–CNXA and 8–CA are opened, releasing these two relays. The release of relay 8–CNXA opens the previously described locking paths for relays 12–DISA and 8–CNA, releasing these relays. Relay 8–CNA released now releases the break count chain relays and opens the pulsing ground for the sequence counting relays. Relay 8–CNXA released opens the previously described operating path for relay 10–EDC and, in the event that no other subscriber is simultaneously attached to the circuit, relay 10–EDC releases releasing, in turn relay 10–CCR and relay 10–CCR releases relay 1–ST whereby the test sentence generator is stopped and the circuit is restored to the initial idle condition.

*Distorted Test Sentence Transmission—Phase Two*

As previously described, relays 10–TS, 10–TSX, 10–TUX and 2–SCX are operated after the transmission of two lines of the undistorted test sentence. In addition, relays 11–C0A and 11–C1A are operated, as previously described. With relay 10–TUX operated, distributor 4–DST2 of the test sentence instruction generator is coded by the wipers of selector TU, as previously described. Relay 10–TSX operated energizes clutch magnet CLM2 of distributor 4–DST2 whereby the first test sentence instruction is applied to lead 400.

It is recalled that lead 400 extends through make contacts 10–TUX–9. With relay 8–CNA operated, however, lead 400 is not extended to the grid of tube TTRA. Accordingly, the first test sentence instruction is not applied to telephone line A.

After the transmission of the first test sentence instruction, the off-normal contacts of selector TU operate, stepping selector TU back to position 1, releasing relay 10–TUX and operating relay 10–TDX in the same manner as previously described. The operation of relay 10–TDX now extends the coding leads to distributor 4–DST2 to the wipers of selector TD whereby the second test sentence instruction is applied to lead 400. Since lead 400 now extends through make contacts 10–TDX–9, make contacts 11–C1A–2, the break contacts of contacts 11–C2A–2, the make contacts of contacts 10–TS–2, the break contacts of contacts 11–C3A–8, the break contacts of contacts 8–B1A–8 and the make contacts of contacts 8–CA–1 to the grid of tube TTRA, the second test sentence instruction is applied to telephone line A by test line subset A.

At the conclusion of the transmission of the second test sentence instruction, selector TD steps to the off-normal position, operating the off-normal contacts and then stepping to position 1 in the same manner as previously described. The operation of the off-normal contacts of selector TD releases relay 10–TDX and operates relay 10–TPX, as previously described. With relay 10–TPX operated, distributor 4–DST2 is coded by the wipers of selector TDP. Accordingly, the third test sentence instruction is applied to lead 400 and lead 400 is extended through make contacts of contacts 10–TPX–9. Since relay 11–C2A is released, however, the signals are not applied to the grid of tube TTRA and accordingly are not transmitted to telephone line A.

At the conclusion of the transmission of the third test sentence instruction, selector TDP steps to the off-normal position and then to position 1. The consequent operation of the off-normal contacts of selector TDP releases relays 10–TS and 10–TPX and operates relay 10–TDPX, as previously described. Relay 10–TS released releases relay 10–TSX and relay 10–TSX in turn stops distributor 4–DST2 and opens the previously described locking path for relay 11–C0A, releasing the relay.

With relay 10–TDPX operated, the previously described operating path for relay 10–OKT is recompleted when relays 7–A5 and 7–B14 of the test sentence generator are simultaneously operated. Relay 10–OKT operated recompletes the previously described operating path for relay 8–CCA and the relay operates and locks by way of make contacts 8–CCA–2.

Relay 8–CCA operated extends the distorted output lead 105 of the test sentence generator through the make contacts of contacts 11–C1A–1, the break contacts of contacts 11–C2A–1, make contacts 8–CCA–1, the break contacts of contacts 11–C3A–1, the break contacts of contacts 10–TS–2, the break contacts of contacts 11–C3A–8, the break contacts of contacts 8–B1A–8, and the make contacts of contacts 8–CA–1 to the grid of tube TTRA.

During the next rotation of distributor 1–DST–1 of the test sentence generator, relays 7–A6 and 7–B14 are simultaneously operated, recompleting the previously described energizing path for step magnet 2–SCS whereby the wipers of selector SCS step to position 2 upon the subsequent release of the chain relays in the test sentence generator. This opens the previously described locking path for relay 2–PR and the relay releases. The two test sentence lines are now generated by the test sentence generator and with lead 105 extending to the grid of tube TTRA two distorted test sentence lines are thereby transmitted to telephone line A.

After the transmission of the second test sentence line, selector SCS steps to position 4 and then self steps home to position 1. With the wipers of selector SCS on position 1, relay 2–SCX is reoperated, as previously described. The reoperation of relay 2–SCX reoperates relay 10–TUX which, in turn, reoperates relay 10–TS in the same manner as previously described. Relay 10–TS operated releases relays 10–TDPX, 2–SCX and 8–CCA and reoperates relays 2–PR and 10–TSX in the same manner as previously described. Relay 10–TSX operated reapplies ground to the subset A sequence counting chain through make contacts 10–TSX–1 and this ground is extended through the break contacts of contacts 11–C9A–4, the make contacts of contacts 11–C1A–4, and the break contacts of contacts 11–C2A–6 to the winding of relay 11–C2A operating the relay which locks by way of the make contacts of contacts 11–C2A–6, the break contacts of contacts 11–C3A–5, the break contacts of contacts 12–TTA–5, and make contacts 8–CNA–10. Relay 11–C2A operated transfers the locking path of relay 11–C1A through the make contacts of contacts 11–C2A–5, make contacts 8–CNA–9, break contacts 8–B1A–10, and make contacts 10–TSX–1. With relays 10–TUX, 10–TS and 10–TSX operated the test sentence instruction generator is again prepared to transmit the instructions.

In the event that the subscriber desires to receive additional lines of distorted test sentences, the subscriber transmits a break signal whereby relay 14–BKA operates, as previously described. The operation of relay 14–BKA operates relay 8–BOA which, in turn, operates relay 8–B1A whereby, as previously described, the output of the test sentence generator is maintained connected to tube TTRA. When the subscriber sends the second break, relay 14–BKA reoperates, operating relay 8–B2A. The operation of relay 8–B2A, as previously described, together with the subsequent reoperation of relay 2–SCX releases relays 8–B1A and 8–B2A and with relay 2–SCX operated, relays 10–TUX and 10–TS operate in turn. Relay 10–TS operated releases relays 10–TDPX and 2–SCX and reoperates relays 2–PR and 10–TSX. The reoperation of relay 10–TSX recompletes the previously described operating path for relay 11–C2A whereby the circuit is placed in the same condition as previously described for the termination of the transmission of the two distorted test sentences.

*Distorted Test Sentence Transmission at Reduced Level—Phase Three*

With relays 10–TUX, 10–TS and 10–TSX operated, the instruction generator is prepared to again transmit the test sentence instructions. In addition, with relay 11–C2A operated the transmitting branch of the test line subset A is extended from pad 1304 through make contact 11–C2A–3, a pad including resistors R3A and R2A and the make contacts of contacts 11–C2A–4 to amplifier 1302. Accordingly, transmission through this third phase is at a reduced level.

The operation of relay 10–TUX extends the wipers of selector TU to the coding leads of distributor 4–DST2. With relay 10–TSX operated, distributor 4–DST2 applies the first sentence instruction to lead 400. Lead 400, however, is not extended to the grid of the tube TTRA since relay 8–CNA is operated.

After the generation of the first test sentence instruction, selector TU self steps back to position 1 and the operation of the off-normal contacts of selector TU releases relay 10–TUX and operates relay 10–TDX. With relay 10–TDX operated, selector TD codes distributor 4–DST2 and the second test sentence instruction is transmitted to lead 400. Lead 400 does not extend to the grid of tube TTRA at this time, however, since relay 11–C1A is released.

After the generation of the second test sentence instruction, selector TD self steps back to position 1 and the operation of the off-normal contacts releases relay 10–TDX and operates relay 10–TPX. With relay 10–TPX operated, the coding leads of distributor 4–DST2 are extended to the wipers of selector TDP whereby the third test sentence instruction is applied to lead 400. At this time, lead 400 extends through make contacts 10–TPX–9, the make contacts of contacts 11–C2A–2, the make contacts of contacts 10–TS–2, the break contacts of contacts 11–C3A–8, the break contacts of contact 8–B1A–8, and the make contacts of contacts 8–CA–1 to the grid of tube TTRA. Accordingly, the third test sentence instruction is transmitted to telephone line A by test line subset A.

At the conclusion of the transmission of the third test sentence instruction, selector TDP self steps back to position 1, as previously described. The operation of the off-normal contacts of selector TDP releases relays 10–TPX and 10–TS and relay 10–TS, in turn, releases relay 10–TSX. Relay 10–TSX released stops the rotation of distributor 4–DST2 and opens the previously described locking path for relay 11–C1A whereby the relay releases. In addition, the operation of the off-normal contacts of selector TDP reoperates relay 10–TDPX. Consequently, when relays 7–A5 and 7–B14 of the test sentence generator operate simultaneously, as previously described, the operating path for relay 10–OKT is recompleted.

Relay 10–OKT operated recompletes the previously described operating path for relay 8–CCA. The operation of relay 8–CCA extends the distorted test sentence output lead 105 through the make contacts of contacts 11–C2A–1, make contacts 8–CCA–1, the break contacts of contacts 11–C3A–1, the break contacts of contacts 10–TS–2, the break contacts of contacts 11–C3A–8, the break contacts of contacts 8–B1A–8, and the make contacts of contacts 8–CA–1 to the grid of tube TTRA. During the following rotation of distributor 1–DST1 of the test sentence generator, relays 7–A6 and 7–B14 are operated simultaneously, re-energizing step magnet 2–SCS. The consequent stepping of the wipers of selector SCS to position 2 releases relay 2–PR, as previously described. The two test sentences are now generated by the test sentence generator and with output lead 105 extended to the grid of tube TTRA and relay 11–C2A operated, whereby an additional pad is inserted in the subset A transmitting branch, the test sentence generator sends to trunk A two distorted test sentence lines at a reduced level.

After the transmission of the second test sentence line, selector SCS self steps home to position 1, whereby relay 2–SCX reoperates, operating in turn relays 10–TUX and 10–TS, as previously described. The operation of relay 10–TS releases relays 8–CCA, 2–SCX and 10–TDPX and reoperates relays 2–PR and 10–TSX. Relay 10–TSX operated re-extends the ground for the subset A sequence counting chain through make contacts 10–TSX–1, break contacts 8–B1A–10, make contacts 8–CNA–9, the break contacts of contacts 11–COA–4, the break contacts of contacts 11–C1A–4, make contacts 11–C2A–10 and the break contacts of contacts 11–C3A–6 to the winding of relay 11–C3A, operating the relay which locks by way of the make contacts of contacts 11–C3A–6, the break contacts of contacts 12–TTA–5, and make contact 8–CNA–10. Relay 11–C3A operated transfers the locking path of relay 11–C2A through the make contacts of contacts 11–C3A–5 to the previously described ground extended through make contacts 10–TSX–1.

*Check of Incoming Transmission—Phase Four*

The operation of relay 11–C3A initiates phase 4 wherein a check of incoming transmission from the remote subscriber set is made while the calling station is still in the originate mode. Relay 11–C3A operated completes an operating path for relay 12–TTA in the subset A contention circuit in the event that no other subset is in phase 4. The operating circuit of relay 12–TTA extends from ground through break contacts 12–TTA–10, the break contacts of the relays corresponding to relay 12–TTA in the other subset contention circuits, break contacts 9–GRD–8, the break contacts of contacts 12–TTA–6, break contacts 12–DISA–12, and make contacts 11–C3A–2 to the winding of relay 12–TTA which locks through the previously described contacts of relays 11–C3A and 12–DISA and the make contacts of contacts 12–TTA–6.

Assuming that another subset is in phase 4 and the relay corresponding to relay 12–TTA is operated, relay 12–TTA cannot operate and test line subset A must wait until the other subset has completed phase 4. During the waiting interval, the grid of tube TTRA is extended through the make contacts of contacts 8–CA–1, the break contacts of contacts 8–B1A–8, the make contacts of contacts 11–C3A–8, the make contacts of contacts 11–C3A–1 and the break contacts of contacts 12–TTA–1 to make contacts 10–LTR–1. Make contacts 10–LTR–1 are, in turn, connected through make contacts 9–GRY–12, make contacts 7–A5–12, and the make contacts of relays 7–B1, 7–B5, 7–B8 and 7–B12 in parallel to negative battery. As described hereinafter, relay 9–GRY is operated when one of the subsets is in phase 4. As previously described, relay 7–A5 is simultaneously operated with one of the above-described 7–B relays during the transmission of the test sentence, and the operation of relay 7–A5 occurs after the transmission of the fifth intelligence element. During the start element of the next successive character, relay 7–A6 operates, operating in turn relay 10–LTR. Accordingly, negative battery is applied to the grid of tube TTRA for a duration equivalent to a start element during each of the first, fifth, eighth, and twelfth cycles of the test sentence generator. This application of negative battery simulates the generation of a letters character and is recognized by the subset subscriber as an indication that another subset is in phase 4.

Assuming now that no other subset is in phase 4, relay 12–TTA operates, as previously described. Relay 12–TTA operated extends output leads 15–T4A and 15–T3A of keyer 1514 to the winding of relay 11–REC as previouly described. Since subset A normally receives a marking signal, this energizes polar relay 11–REC to extend marking ground to telegraph signal distortion indicating set 602 through the marking contacts of contacts 11–REC–1. Relay 12–TTA operated also completes an operating path for relay 9–SMC through make contacts 12–TTA–2. In addition, relay 12–TTA operated extends output lead 300 of distributor 3–DTS3 through the make contacts of contacts 12–TTA–1 to the previously described path extended to the grid of tube TTRA. Finally, relay 12–TTA operated transfers the locking path of relay 11–C3A through the make contacts of contacts 12–TTA–5 and break contacts 5–TOA–7.

The operation of relay 9–SMC completes an operating path for relay 9–ST3 from ground through the normally closed off-normal contacts 904 of selector SW1, break contacts 9–GRY–2, make contacts 9–SMC–9, break contacts 12–DIS–4, break contacts 12–FLP–8, and break contacts 9–RTF–1 to the winding of relay 9–ST3. Relay ST3 operated completes the energizing path for clutch magnet CLM3 of distributor 3–DST3 and prepares the stepping ground of selectors SW1, SW2, SW3, SW4 and SW5 through make contacts 9–ST3–1.

Distributor 3–DST3 together with the above identified selectors comprise the instruction generator for phase 4. The coding leads of distributor 3–DST3 normally extend to the wipers of selector SW1, generally indicated by block 301, through break contacts of relay 9–GRY.

It is noted that the wiper of arc 6 of selector SW1 extends through lead 302, the break contacts of contacts 9–SMC–12, and interruptor contacts 903 to the winding of step magnet 9–SW1. Accordingly, prior to the operation of relay 9–SMC, selector SW1 self steps to the off-normal position in the event that the wipers are on one of positions 2 through 10. In the off-normal position, off-normal contacts 902 close, re-energizing step magnet 9–SW1 whereby selector SW1 steps home to position 1. Therefore, in the normal idle condition, the wipers of selector SW1 are on position 1.

Similarly, the wipers of selectors SW2, SW3, SW4 and SW5, generally indicated by blocks 311, 321, 331 and 341, respectively, extend through leads 312, 322, 332 and 342 to break contacts of relay 9–SMC and the associated interruptor contacts to the respective step magnets. Therefore, the wipers of selectors SW2 through SW5 are normally on position 1.

Arcs 1 through 5 of selector SW1 are strapped to code distributor 3–DST3 with the instruction sentence Carriage-Return Line-Feed G A Space R Y Figures S Letters. For example, positive battery is extended to the fourth segment of distributor 3–DSTS3 through position 1 of arc 4, coding distributor 3–DST3 with the character Carriage-Return.

The operation of relay 9–ST3 releases distributor 3–DST3 for rotation, as previously described, transmitting the first character, Carriage-Return, to tube TTRA, which repeats the signals through test line subset A to telephone line A. During the transmission of the start element of the character, auxiliary contacts AX3 close, operating relay 3–P3. Relay 3–P3 operated extends ground to step magnet 9–SW1 through make contacts 3–P3–1, make contacts 9–ST3–1 and break contacts 9–GRY–1. After the transmission of the fifth intelligence element, auxiliary contacts AX3 reopen, releasing relay 3–P3, which, in turn de-energizes step magnet 9–SW1 whereby the wipers of selector SW1 step to position 2. In this manner the ten characters of the instruction sentence are transmitted to telephone line A and selector SW1 then steps to the off-normal position. This re-energizes step magnet 9–SW1, as previously described, stepping selector SW1 to position 1.

When selector SW1 is in the off-normal position, an operating path for relay 9–GRY is completed through off-normal contacts 905 and the break contacts of contacts 9–GRY–5, operating relay 9–GRY which locks through the make contacts of contacts 9–GRY–5 and make contacts 9–SMC–1. In addition, off-normal contacts 904 open, opening the previously described operating path for relay 9–ST3 and the relay releases. The release of relay 9–ST3 opens the energizing path for clutch magnet CLM3 and distributor 3–DST3 stops rotating.

Relay 9–GRY operated enables the previously described circuit simulating the Letters character by closing make contacts 9–GRY–12. Relay 9–GRY operated also completes an obvious operating path for relay 9–GRD through make contacts 9–GRY–8. In addition, relay 9–GRY operated initiates the operation of timer tube TTST, FIG. 5. Capacitor CP15, which is connected to the grid of timer tube TTST normally has a negative charge applied thereto through break contacts 9–GRY–9. The operation of relay 9–GRY removes this negative battery whereby capacitor CP15 charges to positive battery by way of resistor 503. This raises the potential on the grid of tube TTST whereby the tube will conduct after approximately fifteen seconds.

The remote set responds to the teletypewriter bell signal Figures S Letters calling attention to the subset operator that the transmission of teletypewriter characters R and Y is required. The transmission of the first character is received by subset A and during the start element keyer 1514 operates relay 11–REC to spacing. This spacing condition removes ground from the input of distortion indicating set 602 and applies negative battery thereto by way of resistor 603. In addition, ground is applied through the break contacts of contacts 11–REC–1, the break contacts of contacts 9–RTF–6, make contacts 9–GRY–6 and the break contacts of contacts 6–OSS–5 to the winding of relay 6–OSS, operating the relay which locks through the make contacts of contacts 6–OSS–5, break contacts 11–FLX–8 and make contacts 9–SMC–10.

Relay 6–OSS operated reapplies negative battery to timer capacitor CP15 thereby disabling timer tube TTST. In addition, relay 6–OSS operated opens the operating path of relay 6–OL through break contact 6–OSS–2. Relay 6–OL, however, is locked by the plate current applied through make contact 6–OL–11 to the plate of tube TTOT. In addition, relay 6–OSS operated removes ground normally applied to the plate of capacitor CP16 through the break contacts of contacts 6–OSS–4 and extends the plate of capacitor CP16 through the make contacts of contacts 6–OSS–4, lead 600, make contact 9–GRY–6, FIG. 6, and the break contacts of contacts 9–RTF–6 to the spacing contacts of relay 11–REC. Accordingly, with a marking signal being received from the remote subscriber and relay 11–REC operated to its marking contact, capacitor CP16 starts to charge by way of resistor 504 and the increasing potential is applied to the grid of tube TTET. Conversely, the reception of a spacing signal operates relay 11–REC to its spacing contacts applying ground over the previously described path to the plate of capacitor CP16 whereby the capacitor discharges and the timing circuit is recycled.

Assuming now that the remote subscriber does not respond to the instruction sentence by transmitting teletypewriter characters, relay 6–OSS does not operate and after approximately fifteen seconds tube TTST is turned ON as previously described. The plate current of tube TTST operates relay 5–SOT which, in turn, completes an operating path for relay 12–DIS through make contacts 5–SOT–2 and the break contacts of contacts 12–DIS–6 and relay 12–DIS locks through make contacts 9–SMC–3. In addition, the ground applied through make contacts 5–SOT–2 is extended through make contacts 12–TTA–4 and the break contacts of contacts 12–DISA–5 to the winding of relay 12–DISA operating the relay which locks through make contact 8–CNXA–11.

The operation of relay 12–DISA opens the previously described operating path for relay 12–TTA releasing the latter relay. In addition, relay 12–DISA operated releases relays 8–CNXA and 8–CA and operates relay 15–SA through make contacts 12–DISA–2 and the make contacts of contacts 15–ANA–7. The operation of relay 15–SA initiates the disconnect sequence as described hereinafter thereby disconnecting the test line and consequently disconnecting the remote subscriber. Accordingly, the remote subset is disconnected in the event that it does not respond to the instruction to send the teletypewriter characters within fifteen seconds.

Returning now to the condition where teletypewriter characters are received from the remote subscriber within the appropriate interval whereby relay 6–OSS is operated, the telegraph signals are applied through the marking contacts of relay 11–REC to distortion indicating set 602 as previously described. Distortion indicating sets are well known in the art and a suitable arrangement such as the set disclosed in Patent 2,668,192 granted to S. I. Cory on February 2, 1954, may be employed therein. The disclosure of the Cory patent is hereby incorporated herein by reference as though fully set forth herein.

Figure 6:
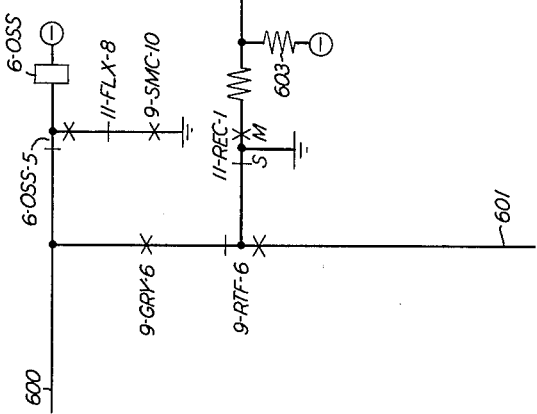

As disclosed in the Cory patent, the reception of undistorted signals by set 602 provides a suitable output potential which is applied as shown in FIG. 6 to the grid of tube TTOT, maintaining the tube conductive. This results in plate current through relay 6–OL as previously described whereby relay 6–OL is maintained operated so long as the signals are not distorted. In the event that distorted signals are received, the grid of tube TTOT is driven in a negative direction by set 602 whereby the tube is cut off and relay 6–OL releases.

After the remote subscriber has concluded transmitting the teletypewriter characters, relay 11–REC is maintained operated to the marking contacts whereby ground is no longer applied through lead 600 to capacitor CP16. The resultant increased potential on the grid of tube TTET turns the tube ON in approximately five seconds, whereby relay 5–EOT is operated by the plate current.

Relay 5–EOT operated further opens the previously described operating path for relay 6–OL by way of break contacts 5–EOT–7. Assuming that undistorted signals are received and relay 6–OL is maintained operated, relay 5–EOT operated completes the operating path for relay 9–OK by way of make contacts 5–EOT–2, break contacts 11–FLX–9, break contacts 11–END–11 and the make contacts of contacts 6–OL–2. In the event, however, that distorted signals are received, whereby relay 6–OL releases, relay 5–EOT operated completes the operating path for relay 9–NG by way of make contacts 5–EOT–2, break contacts 11–FLX–9, break contacts 11–END–11, and the break contacts of contacts 6–OL–2. Accordingly, relay 9–OK is operated if the received signals are undistorted and relay 9–NG is operated if distorted signals are received.

Assuming that relay 9–OK operates, the coding leads of distributor 3–DST3 are extended through break contacts of relay 9–GRY and make contacts of relay 9–OK to the wipers of selector SW2, generally indicated by block 311. Relay 9–OK operated also extends the energizing path for step magnet 9–SW2 to the previously described stepping ground applied via make contacts 9–ST3–1 through make contacts 9–OK–10, break contacts 11–END–9, and break contacts 11–FLX–10. In addition, relay 9–OK operated extends ground to the winding of relay 9–ST3 through make contacts 9–OK–9, make contacts 5–EOT–4, the break contacts of contacts 11–END–6, the break contacts of contacts 11–FLX–6, make contacts 9–SMC–9, break contacts 12–DIS–4, break contacts 12–FLP–8 and break contacts 9–RTF–1.

The operation of relay 9–ST3 energizes clutch magnet CLM3 as previously described, whereby distributor 3–DST3 generates teletypewriter signals in accordance with the strappings of arcs 1 through 5 of selector SW2. In accordance with the present embodiment, the arcs of selector SW2 are strapped to provide the instruction sentence Carriage-Return Line-Feed T R A N Space O K Letters. As previously described, this instruction sentence is applied to the grid of tube TTRA and thereby repeated to telephone line A.

After transmitting the instruction sentence, selector SW2 steps to the off-normal position and then steps home to position 1. While in the off-normal position, off-normal contacts 1114 close, completing an operating path for relay 11–FLX through contacts 1114, make contacts 12–TTA–7, the break contacts of contacts 12–FLPA–3, and the break contacts of contacts 11–FLX–5, operating relay 11–FLX which locks through break contacts 12–FLP–10, break contacts 9–RTF–2, and make contacts 9–SMC–7.

Assuming now that relay 9–NG operates, this completes an operating path for relay 9–ST3 by way of make contacts 9–NG–9 which shunt make contacts 9–OK–9 in the previously described operating path for relay 9–ST3. In addition, relay 9–NG operated extends the coding leads of distributor 3–DST3 to the wipers of selector SW3, generally indicated by block 321, and extends the energizing path for step magnet 9–SW3 to the stepping ground at make contacts 9–ST3–1 by way of make contacts 9–NG–10, break contacts 11–END–10 and break contacts 11–FLX–11. Accordingly, distributor 3–DST3 is coded by selector SW3 to send to telephone line A the instruction sentence Carriage-Return Line-Feed O U T Space L I M Letters.

After the transmission of the instruction sentence, selector SW3 steps to the off-normal position and then self steps home to position 1. While selector SW3 is in the off-normal position an operating path is completed for relay 11–FLX through off-normal contacts 1124 which shunt off-normal contacts 1114 of selector SW2 in the previously described operating path for relay 11–FLX. Accordingly, relay 11–FLX operates and locks, as previously described.

Relay 11–FLX operated opens the previously described operating paths for relays 9–OK and 9–NG through break contacts 11–FLX–9 and the operated one of the relays releases. Relay 11–FLX operated also opens the previously described locking path for relay 6–OSS, and relay 6–OSS released disables timer tube TTET whereby relay 5–EOT releases. The release of relays 5–EOT and 6–OSS recompletes the previously described operating path for relay 6–OL and the relay reoperates if it had previously released. In addition, relay 11–FLX operated completes an operating path for relay 9–ST3 through the make contacts of contacts 11–FLX–6, make contacts 9–SMC–9, break contacts 12–DIS–4, break contacts 12–FLP–8 and break contacts 9–RTF–1. With relay 11–FLX operated the pulsing ground through make contacts 9–ST3–1 is extended to step magnet 9–SW4 through make contacts 11–FLX–12 and the coding leads of distributor 3–DST3 are extended to the wipers of selector SW4, generally indicated by block 331. In accordance with the present embodiment, the strapping of arcs 1 through 5 of selector SW4 provide the instruction sentence Carriage-Return Line-Feed F L I P Figures S S Letters. With relay 9–ST3 operated, distributor 3–DST3 transmits the instruction sentence to telephone line A by way of tube TTRA and selector SW4 steps through the ten positions and then to the off-normal position where it self steps home to position 1, as previously described.

While switch SW4 is on the off-normal position, closure of off-normal contacts 934 completes an operating path for relay 9–RTF and the relay locks by way of the make contacts of contacts 9–RTF–5, break contacts 12–FLP–2, and make contacts 10–CCR–5. Relay 9–RTF operated opens the previously described locking path for relay 11–FLX and the previously described operating path for relay 9–ST3 and these relays release. The operation of relay 9–RTF with relay 12–TTA operated removes the negative battery applied to the plate of timing capacitor CP50A and the capacitor starts to charge by way of resistor R50A and by way of the break contacts of contacts 12–FLPA–6, break contacts 8–B1A–4, the make contacts of contacts 9–RTF–9 and resistor R52A.

Under this condition, tube TTOA will turn ON after an interval of 15 seconds. In addition, relay 9–RTF operated extends the spacing contacts of relay 11–REC through the make contacts of contacts 9–RTF–6 to lead 601 and lead 601, in turn, extends through make contacts 12–TTA–3 to the winding of relay 12–FLPA and through the break contacts of contacts 12–FLP–6 to the winding of slow-to-release relay 12–FLP. These relays will not operate, however, since relay 11–REC is operated to its marking contacts.

*Changing the Mode of Operation*

The transmission of the instruction sentence described above together with the two bell signal, Figures, S, S, Letters, indicates to the remote subscriber that the condition of the subscriber's subset must be changed from the originating mode to the terminating mode. Following the transmission of the instruction sentence, the test line circuit sets for the indicated response from the calling subscriber permitting the outlying station 15 seconds to flip from the originating to the terminating mode. As disclosed in the above-identified application of T. L. Doktor et al., the remote subscriber changes the mode by initiating the disconnect sequence and then following the disconnect sequence by changing the mode to transmit in the $F_2$ frequency band and receive in the $F_1$ frequency band.

The reception of the disconnect spacing signal operates relay 11–REC to the spacing contacts thereby applying ground to lead 601. As previously described, the ground on lead 601 is applied to the windings of relay 12–FLPA and slow-to-release relay 12–FLP. In addition, the ground applied through make contacts 12–TTA–3 is extended by way of lead 1201 to the winding of relay 15–SA. Relay 12–FLP operated locks by way of make contact 9–SMC–2 and opens the previously described locking path of relay 9–RTF, releasing the latter relay. With relay 9–RTF released, the operating path for relay 9–ST3 is maintained open by break contacts 12–FLP–8. Relay 12–FLPA operated locks by way of the make contacts of contacts 12–FLPA–5 and the make contacts of contacts 12–TTA–8. Relay 12–FLPA operated opens the previously described operating paths for relays 8–CA and 8–CNA and these relays release. Relay 12–FLPA operated also transfers the charging path of capacitor CP50A to resistor R51A through the make contacts of contacts 12–FLPA–6, and the break contacts of contacts 8–CNA–8, since relay 8–CNA is now released, reducing the timing of tube TTOA to 4 seconds. In addition, relay 12–FLPA operated completes an operating path for relay 15–ORA whereby relay 15–ORA is temporarily operated.

The operation of relay 15–SA initiates a disconnect sequence by test line subset A. Relay 15–SA operated locks through make contacts 15–SA–6 and the make contacts of contacts 15–ANA–7. Relay 15–SA operated opens the collector circuit of transistor Q4A in modulator 1309 whereby a spacing signal is transmitted although this signal is ignored by the remote data set since it is also in the disconnect sequence. In addition, relay 15–SA operated opens the previously described operating path for relay 15–CYA and the latter relay releases. With relay 15–SA operated and relay 15–CYA released, the windings of relay 15–ORA and 15–ANA are extended through the make contacts of contacts 15–SA–9, the break contacts of contacts 15–CYA–3, the make contacts of contacts 15–ORA–8, and lead 1418 to the collector of transistor Q12A in timer 1411. In timer 1411 the operation of relay 15–SA together with the release of relay 15–CYA opens the path extending from the base of transistor Q10A to diode CR4A by way of the break contacts of contacts 15–SA–7 or the make contacts of contacts 15–CYA–5 in shunt thereto. Prior to the release of relay 15–CYA, however, negative battery is applied through resistor R13A, the make contacts of contacts 15–SA–7, make contacts 15–CYA–5 and the make contacts of contacts 15–CONA–1 to timer capacitor CP7A whereby a negative potential is maintained on the base of transistor Q10A and the transistor is maintained nonconductive. Capacitor CP7A proceeds to charge through resistor R14A and transistor Q10A turns ON after 1 second, turning ON transistors Q11A and Q12A, in turn. When transistor Q12A turns ON, ground is applied by way of the emitter to collector circuit and then by way of lead 1418 over the previously described path to the winding of relays 15–ORA and 15–ANA, shunting the relays whereby they release. The release of relays 15–ORA and 15–ANA open the previously described locking paths for relays 15–MA, 15–CONA and 15–SA and these relays release. Relay 15–CONA released releases relay 8–CNXA. This restores test line subset A to the initial idle condition. With the winding of relay 15–ORA extended to ground by way of make contacts 12–FLPA–4 and to negative battery by way of the break contacts of contacts 15–SA–9, the release of relay 15–SA reoperates relay 15–ORA, and relay 15–ORA operated completes an obvious operating path for relay 8–ORXA.

The reoperation of relay 15–ORA extends ring lead 13–RA through the make contacts of contacts 15–ORA–12, maintaining telephone line A in the off-hook condition. In addition, relay 15–ORA operated extends the transmitting branch through $F_1$ filter 1306 and the receiving branch through $F_2$ filter 1307, as previously described. With relay 15–MA released, discriminator 1412 is arranged to look for signals in the $F_2$ frequency band and timer 1411 is reset to look for the initial marking signal from the remote subscriber set, as previously described.

If the calling subscriber does not initiate the disconnect sequence within 15 seconds, with relay 12–FLPA released the grid of tube TTOA is rendered sufficiently positive to turn ON the tube and operate relay 5–TOA. Relay 5–TOA operated extends ground through make contacts 5–TOA–2 to the winding of relay 12–DISA, as previously described, and the ground is also applied through make contacts 12–TTA–4 to the winding of relay 12–DIS. As described above, the operation of relays 12–DISA and 12–DIS then disconnects the calling subscriber.

*Repeat of Four Phase Cycle*

With relay 15–ORA operated, the second four phase cycle is initiated by the reception of the marking frequency from the remote subscriber subset. The reception of the marking frequency turns ON transistor Q12A of timer 1411 whereby relay 15–CONA operates, operating in turn relay 15–CYA, as previously described. With relays 15–CONA and 15–CYA operated, timer 1411 is now arranged to look for spacing signals and transistor Q7A in discriminator 1412 is activated, whereby the incoming signals are applied to keyer 1514, as previously described. In addition, relay 15–CONA operated extends battery to oscillator transistor Q2A whereby marking in the $F_1$ frequency band is returned through telephone line A. Accordingly, test line subset A is now again arranged to communicate with the remote subscriber with the exception that subset A is now in the originating mode rather than the terminating mode.

Relay 15–CONA operated operates relay 8–CNXA. At the end of the four second charging interval of timer capacitor CP50A tube TTOA is turned ON, as previously described, operating relay 5–TOA. Relay 5–TOA operated opens the previously described locking path for relay 11–C3A, releasing the relay. The release of relay 11–C3A opens the previously described operating and locking path of relay 12–TTA and relay 12–TTA released, releases relay 9–SMC. In addition, with relay 12–TTA released and relay 8–CNXA now operated, the locking path for relay 12–FLPA is transferred through the break contacts of contacts 12–TTA–8 and make contacts 8–CNXA–12.

Relay 9–SMC released opens the previously described locking paths for relays 12–FLP and 9–GRY and relay 9-GRY in turn releases relay 9-GRD. This restores the test line circuit to its initial condition with the exception that relays 8-CNXA and 8-ORXA are operated, as previously described.

With relay 8-CNXA operated, relays 10-EDC and 10-CCR operate, in turn, as previously described. Relay 10-CCR operated operates relays 2-SCX and 1-ST1 in the same manner as previously described. The operation of relay 2-SCX completes the previously described operating path for relay 10-TUX and completes the operating path for relay 8-CA through make contacts 8-ORXA-1 which shunts break contacts 12-FLPA-1 in the previously described operating path for relay 8-CA. With relays 10-TUX and 8-CA operated together with relay 10-CCR, the test line circuit is again put through phases 1 through 3 in the same manner as previously described with the exception that the operating path for relay 8-CNA is completed through make contacts 8-ORXA-2 which shunt break contacts 12-FLPA-7 in the previously described operating path for relay 8-CNA.

In addition, relay 8-CNA operated re-extends negative battery to the grid of tube TTOA through the make contacts of contacts 12-FLPA-6 and the make contacts of contacts 8-CNA-8 shunting the previously described negative voltage disabling path through the break contacts of contacts 12-FLPA-6. The consequent release of relay 5-TOA now completes a path from ground to the winding of relay 12-CXA through break contacts 5-TOA-6, break contacts 11-C3A-11, the break contacts of contacts 12-CXA-9 and make contacts 12-FLPA-11 operating relay 12-CXA which locks through make contacts 12-FLPA-11 and the make contacts of contacts 12-CXA-9. Relay 12-CXA operated now partially completes an operating path for relay 12-DISA through make contacts 12-CXA-10 which shunt break contacts 12-FLPA-9.

Accordingly, the test line circuit continues through the first three phases in the same manner as during the first cycle with the exceptions noted above.

At the start of the fourth phase, relay 12-TTA reoperates in the event that no other subset has seized the contention circuit. With relay 12-TTA operated, test line subset A, which is now in the originating mode, is again arranged to receive signals from the remote subscriber and apply the signals to receiving relay 11-REC. The subsequent sequence of the circuit during phase 4 is the same with the instruction generator advising the remote subscriber whether or not the signal transmission is distorted. At the conclusion of the sentence, off-normal contacts 1114 or off-normal contacts 1124 close, as previously described. This now completes a path from ground through contacts 1114 or 1124, make contacts 12-TTA-7, the make contacts of contacts 12-FLPA-3 and the break contacts of contacts 11-END-5 to the winding of relay 11-END, operating the relay which locks through the make contacts of contacts 11-END-5 and make contacts 9-SMC-4. Relay 11-END operated opens the previously described operating path for relays 9-OK and 9-NG and the operated one of these relays releases. Relay 11-END operated also extends the pulsing ground through make contacts 3-P3-1 by way of make contacts 11-END-12 to the winding of step magnet 9-SW5. Relay 11-END operated also completes the operating path for relay 9-ST3 through the make contacts of contacts 11-END-6, the break contacts of contacts 11-FLX-6, make contacts 9-SMC-9, break contacts 12-DIS-4, break contacts 12-FLP-8 and break contacts 9-RTF-1, operating relay 9-ST3. In addition, relay 11-END operated extends the segment of distributor 3-DST3 to arcs 1 through 5 of selector SW5, generally indicated by block 341. With relay 9-ST3 reoperated, clutch magnet CLM3 of distributor 3-DST3 is re-energized, whereby an instruction sentence is transmitted in accordance with the strappings of positions 1 through 5 of selector SW5. This sentence may suitably comprise the characters Carriage-Return Line-Feed T N X Space E N D Letters.

After the transmission of the final test sentence, selector SW5 steps to the off-normal position and then steps home to position 1. While in the off-normal position, off-normal contacts 1244 of selector SW5 complete an operating path from ground through contacts 1244 and the break contacts of contacts 12-DIS-6 to the winding of relay 12-DIS, operating the relay which locks, as previously described. In addition, the closure of contacts 1244 extends ground through make contacts 12-TTA-4 and the break contacts of contacts 12-DISA-5 to the winding of relay 12-DISA, operating the relay which locks as previously described. The operation of relay 12-DIS opens the previously described operating path for relay 9-ST3 and relay 9-ST3 released de-energizes clutch magnet CLM3 thereby stopping the distributor 3-DST3. Relay 12-DISA operated opens the previously described locking paths for relays 8-CNA, 8-CA and 12-TTA and these relays release. The release of relays 8-CNA and 12-TTA release relays 11-C3A and 9-SMC, as previously described. With relay 9-SMC released, together with the release of relays 8-CNA and 8-CA, the other operated ones of the test line circuit relay are released, returning the circuit to the initial idle condition.

Returning now to relay 12-DISA operated, an operating path is completed for relay 15-SA through make contacts 12-DISA-2, make contacts 15-ORA-10, and the break contacts of contacts 15-ANA-7 operating relay 15-SA which locks through make contacts 15-SA-6 shunting make contacts 12-DISA-2. The operation of relay 15-SA initiates the disconnect sequence by opening the path connecting the emitter of transistor Q4A to the base of transistor Q3A in modulator 1309 whereby a spacing disconnect signal is transmitted to telephone line A. In addition, relay 15-SA operated releases relay 15-CYA as previously described whereby timing capacitor CP7A is disconnected from diode CR4A and proceeds to charge through resistor R14A. After a one second interval, transistor Q10A turns ON, turning ON in turn transistors Q11A and Q12A. With transistor Q12A conductive, ground is applied through lead 1418, the make contacts of contacts 15-ORA-8, the break contacts of contacts 15-CYA-3, and the make contacts of contacts 15-SA-9 to the winding of relay 15-ORA, shunting down the relay. The consequent release of relay 15-ORA opens the previously described locking path for relays 15-SA and 15-CONA and the release of relay 15-CONA releases relay 8-CNXA. This now restores test line subset A and its associated relay circuits to the initial idle condition.

*Testing a Multiplicity of Stations Simultaneously*

As previously indicated, the test line circuit has the capability of simultaneously operating on the sequence basis with a plurality of remote subscriber stations. The detailed explanation of the operation of the circuitry was based on test line subset A. However, the operation of the circuitry associated with test line subset B through test line subset D is substantially identical with the exception that the components terminating with the suffix A is substituted for components terminating with the suffix B, C or D. For example, assuming a call comes in on telephone line B, relays 15-ANB, 15-MB, 15-CONB and 15-CYB in test line subset B initially operate in the same manner as the corresponding relays operate in test line subset A. In addition, the operation of relay 15-CONB operates relay 8-CNXB, not shown, but generally indicated as part of subset B phase control, in the same manner as the operation of corresponding relay 8-CNXA. Accordingly, relay 8-CNXB operated completes the operating path for relay 10-EDC through make contacts 8-CNXB-10, and break contacts 11-C3B-9 whereby the operation of the test line circuit proceeds through the four phases in the same manner as previously described for test line subset A.

Assuming now that telephone line B is called at the same time as telephone line A, relay 10-EDC is operated by either or both of the phase control relays. This initiates phase 1 whereby the first test sentence instruction is applied through lead 400 to the grid of tube TTRA, as previously described. In addition, lead 400 is extended to input terminal 1 of subset B signal input gate, generally indicated by block 202, and then through the relay contacts, corresponding to the contacts disclosed in subset A signal input gate, to the grid of tube TTRB which corresponds to tube TTRA. Accordingly, the same instruction sentence is simultaneously transmitted to telephone line A and telephone line B.

When the test sentence generator transmits the test sentence through lead 101 to tube TTRA the test sentence is simultaneously transmitted through input lead 4 of the subset B signal input gate to tube TTRB whereby the test sentence is simultaneously applied to telephone line A and telephone line B. In addition, during phases 2 and 3, the distorted test sentence applied through lead 105 of tube TTRA is simultaneously applied to input terminal 5 of the subset B signal input gate to tube TTRB. It is thus seen that any two or more of the sets may simultaneously be in the same phase in phases 1 through 3.

At the termination of phase 3, the fourth phase is initiated by the operation of relay 12-TTA, for example. In this case, however, only one subset may be in phase 4 at a time. This is provided by extending the operating path of the contention circuit relays through the break contacts of the other contention circuit relays. Accordingly, only one of these relays may operate, placing the subset in phase 4. Assuming that test line subset A has entered phase 4 and test line subset B must await the completion of phase 4 by test line subset A, it is noted that the Letters generator which extends to input terminal 6 of subset B signal input gate provides an indication to the remote subscriber that there is a delay. After the completion of phase 4 by subset A, relay 12-TTA releases, as previously described, whereby relay 12-TTB, not shown, but generally indicated by the block identified as subset B contention circuit operates, whereby subset B enters the 4th phase in the same manner as previously described for subset A.

Assuming now that telephone line A receives a call initiating the operation of the test line circuit and the test sentence generator together with the operation and subsequent release of relay 2-SCX, if a call is now received on telephone line B, relay 8-CNXB operates, as previously described, and relays 10-EDC and 10-CCR are previously operated by the call from telephone line A. In this event, however, relay 8-CB in the subset B phase control, which relay corresponds to relay 8-CA, cannot operate because relay 2-SCX is released. Accordingly, test line subset B must await the subsequent reoperation of relay 2-SCX which occurs, as previously described, after the transmission of the two test sentence lines to telephone line A. During this interval, with relay 8-CNXB operated, the Letters generator is extended through input terminal B of the subset B signal input gate through the contacts therein corresponding to make contacts 8-CNXA-9, break contacts 11-C3A-10 and the break contacts of contacts 8-CA-1 in the subset A signal input gate. Accordingly, Letters signals are transmitted to telephone line B, indicating a momentary delay.

At the termination of the transmission of the two test sentence lines to telephone line A, relay 2-SCX reoperates, whereby relay 8-CB may operate. With the operation of relay 8-CB, test line subset B now enters phase 1 and the first test sentence instruction is transmitted to telephone line B, as previously described. Under this condition, and recalling that test line subset B has completed phase 1 and has now entered phase 2 it is noted that the second test sentence instruction is now extended to tube TTRA and therefore transmitted to telephone line A. During the transmission of the test sentence, with test line subset A in phase 2, the two distorted test sentences are transmitted to telephone line A, as previously described. With test line subset B in phase 1, however, the undistorted test sentences are transmitted to telephone line B. Accordingly, each of the test line subsets may simultaneously be in different phases and two or more of the test line subsets may simultaneously be in the same phase with the above-noted exception of phase 4.

*Test Sentence Subset*

Figure 17:
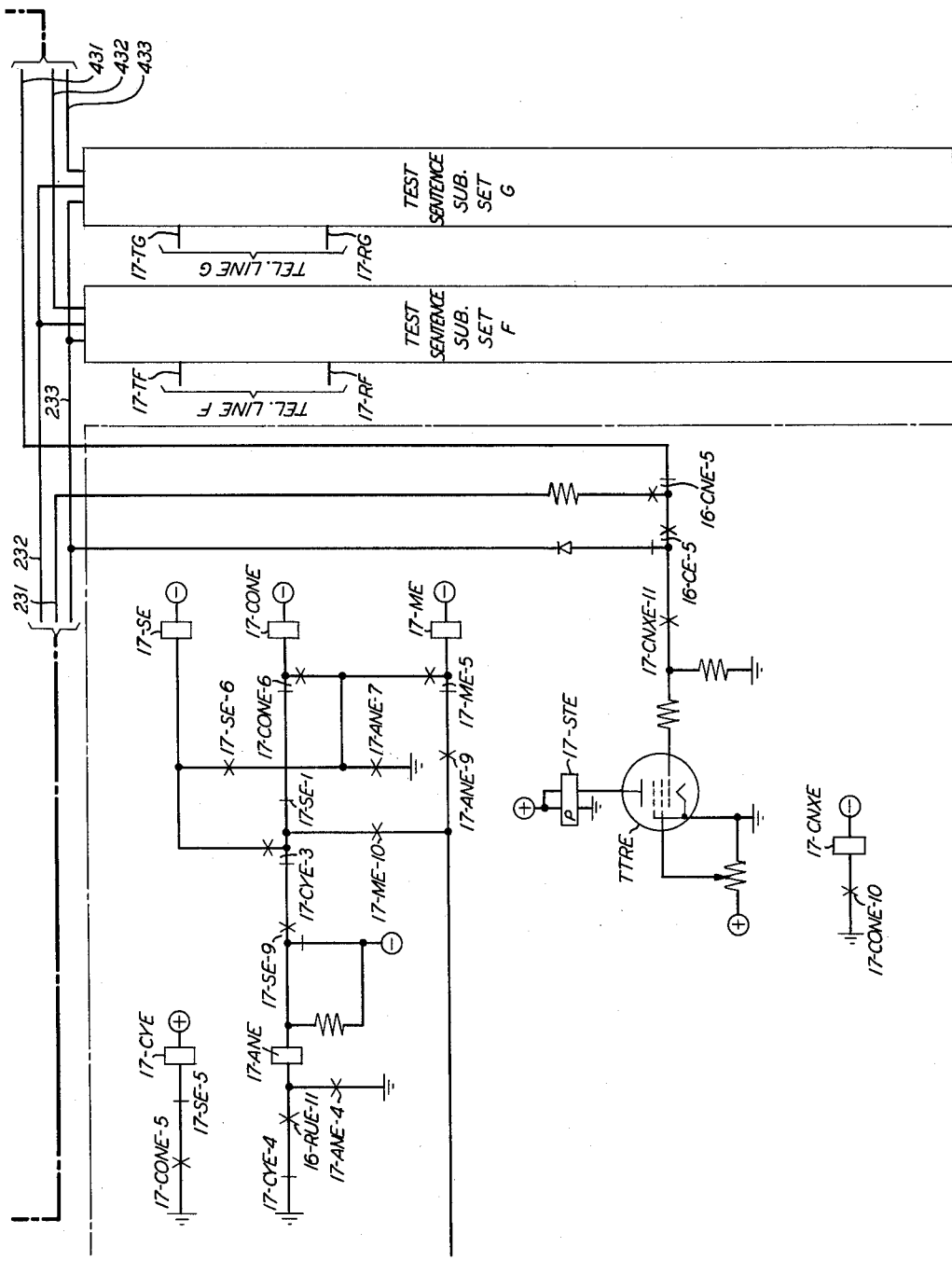
Figure 19:
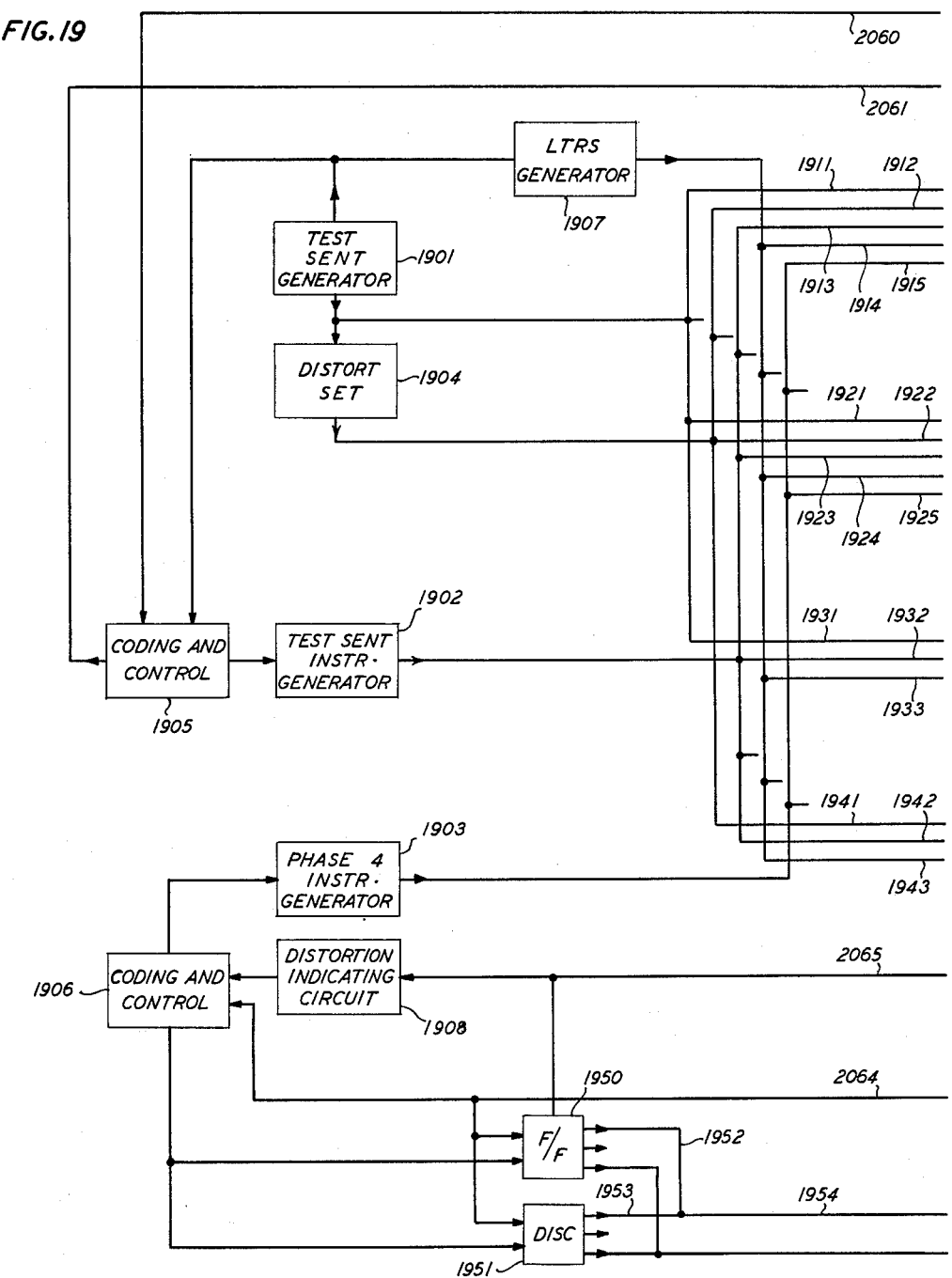
Figure 20:
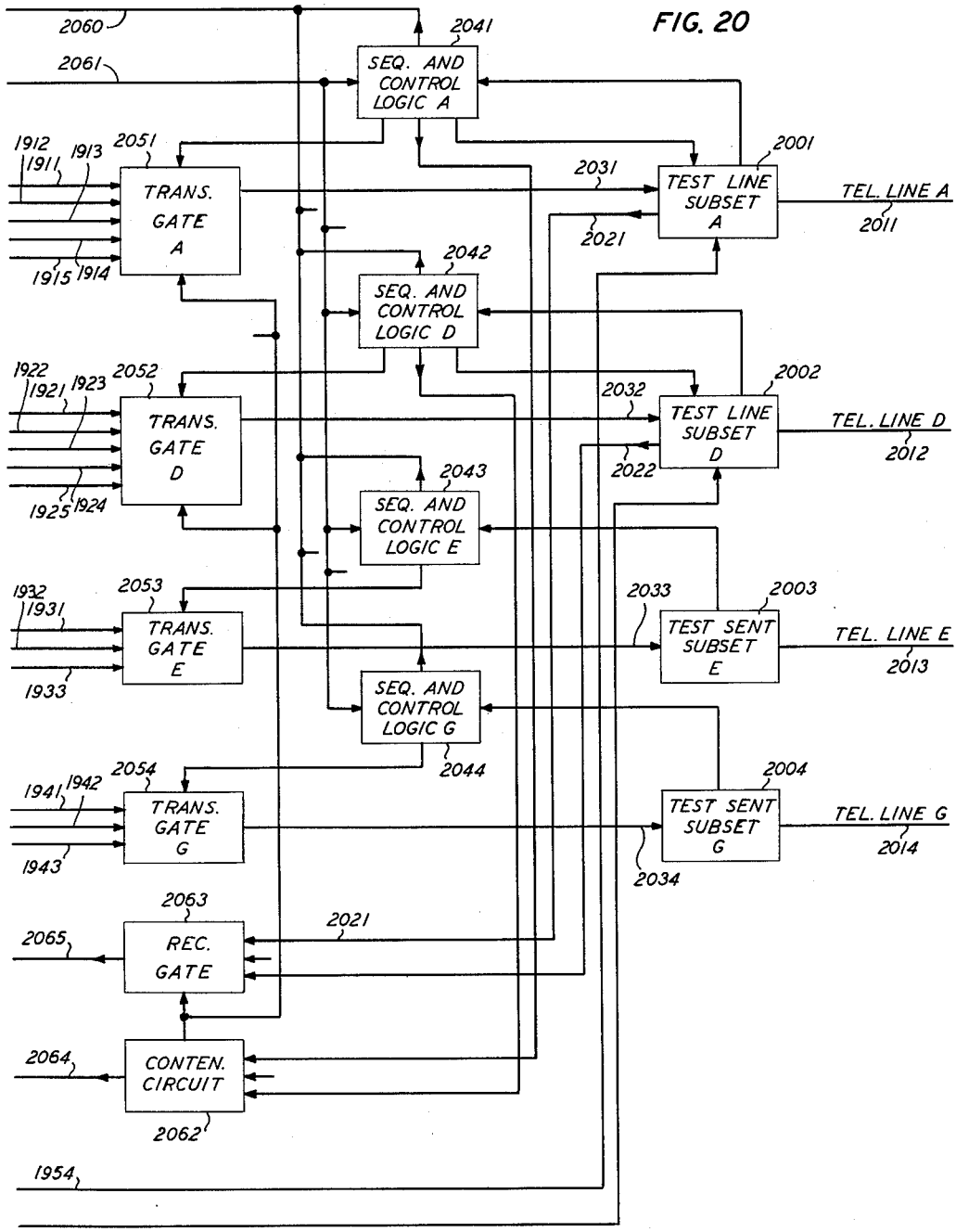

In addition to the above-described test line subsets the automatic test line is provided with three test sentence subsets which are arranged as a steady source of the test sentence teletypewriter signals. Test sentence subset E, shown in FIG. 16 and a portion of FIG. 17 provides, in accordance with the present embodiment, a source of undistorted signals, while test sentence subset F and test sentence subset G, FIG. 17, provide a source of distorted signals and a source of distorted signals at a reduced level, respectively.

Test sentence subset E includes hybrid 1601, amplifiers 1602 and 1603, pad 1604, $F_1$ filter 1606, $F_2$ filter 1607, limiter 1608, modulator 1609, timer 1611 and discriminator 1612 and associated relay circuitry, which components are arranged in substantially the same manner as the components in test line subset A. Subset E, however, is always arranged to be in the terminating mode whereby the relay corresponding to relay 15-ORA in subset A is not included in subset E.

Assuming now that the calling subscriber desires a steady source of undistorted signals, telephone line E is dialed and the ringing signals applied across ring lead 16-RE and tip lead 16-TE are further applied across the break contacts of contacts 17-ANE-3, capacitor CP1E, thermistor RTE and the winding of relay 16-RUE whereby the relay is operated during the ringing cycle. The operation of relay 16-RUE starts the same sequence in test sentence subset E as previously described for the operation of relay 16-RUA in subset A. Accordingly, relay 16-RUE operates relay 17-ANE. Relay 17-ANE, in turn, places telephone line E in the off-hook condition and prepares modulator 1609 to return marking in the $F_2$ frequency band to telephone line E. In addition, relay 17-ANE operated initiates the guard interval provided by timer 1611 whereby at the conclusion thereof ground is applied to the winding of relay 17-ME. Relay 17-ME operated activates modulator 1609 to send the marking signal in the $F_2$ frequency band, arranges discriminator 1612 to respond to signals in the $F_1$ frequency band, and prepares timer 1611 to look for the reception of marking signals. The reception of the marking frequency now operates relay 17-CONE in the same manner as the corresponding relay 15-CONA in subset A. With relay 17-CONE operated, relay 17-CYE operates, providing the logical signal inversion in discriminator 1612 and arranging timer 1611 to look for spacing signals. In addition, relay 17-CONE operated completes an obvious operating path for relay 17-CNXE and relay 17-CNXE, in turn, extends ground to the winding of relay 10-EDC by way of make contacts 17-CNXE-10 and break contacts 16-CNE-9, operating relay 10-EDC in the event that the relay was not previously operated by another subset. With relay 10-EDC operated relay 10-CCR operates in the same manner as previously described. The operation of relay 10-CCR operates relay 1-ST whereby the test sentence generator is started and with relays 10-EDC and 10-CCR operated, the winding of relay 2-SCX is extended to position 1 of arc 2 of selector SCS, as previously described.

In the event that another subset is being serviced by the automatic test line whereby one of relays 10-TS or 2-PR is operated, or selector SCS is not on position 1, relay 2-SCX cannot operate. In this event, the output of the above-described Letters generator is extended through lead 233, the break contacts of contacts 16–CE–5 in subset E and make contacts 17–CNXE–11 to the grid of tube TTRE. Accordingly, the application of the simulated Letters characters to the grid of tube TTRE is repeated by relay 17–STE to input terminal 2 of modulator 1609 and then to telephone line E to advise the subscriber of the momentary delay.

Assuming now that the automatic test line is idle or that a phase of the test line operation has been completed, relay 2–SCX operates, as previously described. The operation of relay 2–SCX completes an operating path for relay 16–CE through make contacts 2–SCX–6 and make contacts 17–CNXE–12 operating relay 16–CE which locks through make contacts 16–CE–2 and make contacts 17–CNXE–12. Relay 16–CE operated provides a supplementary holding path for relay 10–CCR. In addition, relay 2–SCX operated operates relay 10–TUX. With relay 10–TUX operated, the operation of the test sentence instruction generator is initiated, as previously described. In addition, the operation of relay 10–TUX together with the operation of relay 16–CE extends output lead 400 of distributor 4–DST2 through make contacts 10–TUX–13, lead 431, the break contacts of contacts 16–CNE–5 in subset E, the make contacts of contacts 16–CE–5 and make contacts 17–CNXE–11 to the grid of tube TTRE. Accordingly, the first test sentence instruction is applied to telephone line E and the second and third test sentence instructions are blocked from telephone line E by the subsequent release of relay 10–TUX.

After the transmission of the test sentence instruction relay 10–OKT operates, as previously described. The operation of relay 10–OKT completes an operating path for relay 16–CNE through make contacts 16–CE–3, and make contacts 10–OKT–5, operating relay 16–CNE which locks through make contacts 16–CNE–2 and make contacts 17–CNXE–12. Relay 16–CNE operated now extends the undistorted output lead 101 of the test sentence generator through lead 231, the make contacts of contacts 16–CNE–5 in subset E, the make contacts of contacts 16–CE–5 and make contacts 17–CNXE–11 to the grid of tube TTRE. Accordingly, the undistorted test sentence is applied to telephone line E.

Since the subsequent operation of relay 10–TSX prior to the generation of the new test sentence instruction does not effect the condition of relays 16–CE, 16–CNE and 17–CNXE, it is apparent that the test sentences will be continuously transmitted to telephone line E by subset E. In the event that the calling subscriber no longer desires to receive the test sentences, however, he initiates a disconnect sequence.

The reception of the spacing signal in the disconnect sequence is recognized by timer 1611 whereby relay 17–SE is operated by the application of ground through make contacts 17–ME–10 and the make contacts of contacts 17–CYE–3. Relay 17–SE operated initiates the disconnect sequence in subset E by releasing relay 17–CYE and arranging a shunt down path for relay 17–ANE at the conclusion of the one-second interval. The consequent release of relay 17–ANE releases relays 17–ME, 17–SE and 17–CONE and relay 17–CONE releases relay 17–CNXE. With relay 17–CNXE released, relay 16–CNE and relay 16–CE release. This releases relay 10–CCR and also relay 10–EDC, if it is operated. With these latter relays released, the automatic test line has returned to the initial idle condition.

In the event that the calling subscriber desires a continuous source of distorted test sentences, telephone line F is dialed whereby test sentence subset F is placed in the terminating mode in substantially the same manner as previously described for subset E. The subseqeunt operation of relay 10–TDX prior to the generation of the second test sentence instruction by distributor 4–DST2 extends output lead 400 through make contacts 10–TDX–8, lead 432, and the relay contacts corresponding to contacts 16–CNE–5, 16–CE–5 and 17–CNXE–11 in subset E to the grid of tube TTRF of subset F. Accordingly, the second test sentence instruction is applied to telephone line F. The subsequent operation of relay 10–OKT now operates the relay in subset F corresponding to relay 16–CNE in subset E extending the distorted test sentence output lead 105 through lead 232 to tube TTRF. A continuous source of distorted test sentence signals is thereby applied to telephone line F until the calling subscriber initiates the disconnect sequence to return the circuit to the idle condition. In a similar manner, a call to telephone line G extends the third test sentence instruction through make contacts 10–TPX–8 and lead 433 to tube TTRG and the subsequent operation of relay 10–OKT extends lead 232 to tube TTRG. Test sentence subset G, however, is preferably provided with a pad in the transmitting branch corresponding to resistors R2A and R3A in subset A, whereby a continuous source of distorted signals at a reduced level is applied to telephone line G.

Although a specific embodiment of this invention has been shown and described, it will be understood that various modifications may be made without departing from the spirit of this invention and within the scope of the appended claims.

What is claimed is:

1. In a data system, a transmission line, first signaling means including a first and second output for simultaneously transmitting a data signal message to said outputs during repeated intervals, second signaling means for transmitting a first and second data signal sequence during a first and second interval, respectively, and means responsive to a call from said transmission line for sequentially extending said line to said second signaling means during said first interval, to said first output of said first signaling means during said message interval, to said second signaling means during said second interval, and to said second output of said first signaling means during said message interval.

2. In a data system, a plurality of transmission lines, first signaling means including a first and second output for transmitting a data signal message during repeated intervals, second signaling means for transmitting a first and second data signal sequence during a first and second interval, respectively, and means responsive to a call from any one of said transmission lines for sequentially extending said one line to said second signaling means during said first interval, to said first output of said first signaling means during said message interval, to said second signaling means during said second interval, and to said second output of said first signaling means during said message interval.

3. In a data system, a plurality of transmission lines, first signaling means including a firstand second output for transmitting a data signal message during repeated intervals, second signaling means for transmitting a first and second data signal sequence during a first and second interval, respectively, means responsive to a call from any one of said lines for extending said one line to said second signaling means during said first interval and extending said one line to said first output of said first signaling means during said message interval, and means responsive to the termination of said message interval for extending said one line to said second signaling means during said second interval and extending said one line to said second output of said first signaling means during said message interval.

4. In a data system, a plurality of transmission lines, first signaling means including a first and second output for transmitting a data signal message during repeated intervals, second signaling means for transmitting a first and second data signal sequence during a first and second interval, respectively, means responsive to a call from any one of said lines for extending said one line to said second signaling means during said first interval, means responsive to the termination of said first interval for extending said one line to said first output of said first signaling means during said message interval, means responsive to the termination of said message interval for extending said one line to said second signaling means during said second interval, and means responsive to the termination of said second interval for extending said one line to said second output of said first signaling means during said message interval.

5. In a data system, a plurality of transmission lines, first signaling means including a first and second output for transmitting a data signal message during repeated intervals, second signaling means for transmitting a first and second data signal sequence during a first and second interval, respectively, means responsive to a call from any one of said lines for enabling said second signaling means and extending said one line to said second signaling means during said first interval, means responsive to the termination of said first interval for extending said one line to said first output of said first signaling means during said message interval, means responsive to the termination of said message interval for re-enabling said second signaling means and extending said one line to said second signaling means during said second interval, and means responsive to the termination of said second interval for extending said one line to said second output of said first signaling means during said message interval.

6. In a data system, a plurality of transmission lines, first signaling means including a first and second output for transmitting a data signal message during repeated intervals, second signaling means for transmitting a first and second data signal sequence during an interval, count means associated with each of said lines and responsive to a call from said associated line for providing a first count condition, means responsive to the termination of said message interval for advancing said count means to a second count condition, gate means responsive to said count means in said first count condition for simultaneously extending said associated lines to said second signaling means during said interval and to said first output of said first signaling means during said message interval, and other gate means responsive to said count means in said second count condition for simultaneously extending said associated lines to said second signaling means during said interval and to said second output of said first signaling means during said message interval.

7. In a data system, a plurality of transmission lines, first signaling means including a first and second output for transmitting a data signal message during repeated intervals, second signaling means for transmitting a data signal sequence during an interval, count means associated with each of said lines and responsive to a call from said associated line for providing a first count condition, means responsive to the termination of said message interval for advancing said count means to a second count condition, gate means responsive to said count means in said first count condition for simultaneously extending said associated lines to said second signaling means during said interval and to said first output of said first signaling means during said message interval, other gate means responsive to said count means in said second count condition for simultaneously extending said associated lines to said second signaling means during said interval and to said second output of said first signaling means during said message interval, and means responsive to the reception of a predetermined signal from said associated lines during the interval that said count circuit is in one of said count conditions for maintaining said count circuit in said one count condition.

8. In a data system, a plurality of transmission lines, first signaling means for transmitting a data signal message during repeated intervals, second signaling means for transmitting a first and second data signal sequence during a first and second interval, respectively, count means associated with each of said lines and responsive to a call from said associated line for providing a first count condition, means responsive to the termination of said message interval for advancing said count means to a second count condition, gate means responsive to said count means in said first count condition for simultaneously extending said associated lines to said second signaling means during said first interval and to the output of said first signaling means during said message interval, and other gate means responsive to said count means in said second count condition for simultaneously extending said associated lines to said second signaling means during said second interval and to the output of said first signaling means during said message interval.

9. In a data system, a plurality of transmission lines, first signaling means for transmitting a data signal message during repeated intervals, second signaling means for transmitting a first and second data signal sequence during a first and second interval, respectively, count means associated with each of said lines and responsive to a call from said associated line for providing a first count condition, means responsive to the termination of said message interval for advancing said count means to a second count condition, gate means responsive to said count means in said first count condition for simultaneously extending said associated lines to said second signaling means during said first interval and to the output of said first signaling means during said message interval, other gate means responsive to said count means in said second count condition for simultaneously extending said associated lines to said second signaling means during said second interval and to the output of said first signaling means during said message interval, and means responsive to the reception of a predetermined signal from said associated lines during the interval that said count circuit is in one of said count conditions for maintaining said count circuit in said one count condition.

10. In a data system, a transmission line, first signaling means including a first and second output for transmitting a data signal message during repeated intervals, second signaling means for transmitting a first and second data signal sequence during a first and second interval, respectively, count means responsive to a call from said line for providing a first count condition, means responsive to the termination of said message interval for advancing said count means to a second count condition, gate means responsive to said count means in said first count condition for extending said line to said second signaling means during said first interval and to said first output of said first signaling means during said message interval, other gate means responsive to said count means in said second count condition for extending said line to said second signaling means during said second interval and to said second output of said first signaling means during said message interval, and means responsive to the reception of a predetermined signal from said associated lines during the interval that said count circuit is in one of said count conditions for maintaining said count circuit in said one count condition.

11. In a data system, a transmission line, first signaling means including a first and second output for transmitting a data signal message during repeated intervals, second signaling means for transmitting a first and second data signal sequence during a first and second interval, respectively, count means responsive to a call from said line for providing a first count condition, means responsive to the termination of said message interval for advancing said count means to a second count condition, gate means responsive to said count means in said first count condition for extending said line to said second signaling means during said first interval and to said first output of said first signaling means during said message interval, and other gate means responsive to said count means in said second count condition for extending said line to said second signaling means during said second interval and to said second output of said first signaling means during said message interval.

12. In a data system, a transmission line, first signaling means including a first and second output for transmitting a data signal message during repeated intervals, second signaling means for transmitting a first and second data signal sequence during a first and second interval, respectively, count means responsive to a call from said line for providing a first count condition, means responsive to the termination of each of said message intervals for further advancing said count means, gate means responsive to said count means in said first count condition for extending said line to said second signaling means during said first interval and to said first output of said first signaling means during said message interval, other gate means responsive to said count means in a second count condition for extending said line to said second signaling means during said second interval and to said second output of said first signaling means during said message interval, signal measuring means for providing a signal in accordance with signals applied thereto, third signaling means for transmitting a data signal sequence in accordance with the signal provided by said signal measuring means, and further gate means responsive to said count means in a third count condition for extending said line to the input of said signal measuring means and the output of said third signaling means.

13. In a data system, a plurality of transmission lines, first signaling means for transmitting a data signal message during repeated intervals, second signaling means for transmitting a data signal sequence during successive intervals, count means associated with each of said lines enabled in response to a call from said associated line, means responsive to the termination of each message interval for advancing said enabled count means to successive count conditions, and means responsive to said count means for extending said associated line to said second signaling means during said successive interval and to said first signaling means during said repeated interval during each count condition.

14. In a data system, a plurality of transmission lines, first signaling means including a first and second output for transmitting a data signal message during repeated intervals, second signaling means for transmitting a data signal sequence during successive intervals, count means associated with each of said lines enabled in response to a call from said associated line, means responsive to the termination of a first and second message interval for advancing said enabled count means to a first and second count condition, respectively, and means responsive to said count means for extending said associated line to said second signaling means during said successive interval and to said first output during said message interval while said count means is in said first count condition and to said second signaling means during said successive interval and to said second output during said message interval while said count means is in said second count condition.

15. In a data system, a plurality of transmission lines, first signaling means including a first and second output for transmitting a data signal message during repeated intervals, second signaling means for transmitting a first and second data signal sequence during a first and second interval, respectively, count means associated with each of said lines enabled in response to a call from said associated line, means responsive to the termination of a first and second message interval for advancing said enabled count means to a first and second count condition, respectively, and means responsive to said count means for extending said associated line to said second signaling means during said first interval and to said first output during said message interval while said count means is in said first count condition and to said second signaling means during said second interval and to said second output during said message interval while said count means is in said second count condition.

References Cited in the file of this patent
UNITED STATES PATENTS
3,084,231 Meyers _____ Apr. 2, 1963